(12) United States Patent
Hoshi

(10) Patent No.: US 7,694,985 B2
(45) Date of Patent: Apr. 13, 2010

(54) REINFORCED MOTORCYCLE FRAME

(75) Inventor: Norio Hoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 943 days.

(21) Appl. No.: 11/440,242

(22) Filed: May 24, 2006

(65) Prior Publication Data

US 2007/0018420 A1 Jan. 25, 2007

(30) Foreign Application Priority Data

Jun. 30, 2005 (JP) ............................. 2005-221866

(51) Int. Cl.
*B62K 11/02* (2006.01)
*B62K 19/00* (2006.01)
(52) U.S. Cl. .................................... 280/274; 280/281.1
(58) Field of Classification Search ................. 180/219, 180/227, 228; 280/274–277, 279, 280, 281.1, 280/282–286
See application file for complete search history.

(56) References Cited

U.S. PATENT DOCUMENTS

| | | | |
|---|---|---|---|
| 6,481,522 B1 * | 11/2002 | Adachi ....................... | 180/219 |
| 6,679,347 B2 * | 1/2004 | Iimuro ........................ | 180/219 |
| 7,360,619 B2 * | 4/2008 | Adachi et al. ................ | 180/219 |
| 2001/0030072 A1 * | 10/2001 | Okuma ........................ | 180/219 |
| 2005/0247500 A1 * | 11/2005 | Miyamoto ................... | 180/219 |
| 2006/0157955 A1 * | 7/2006 | Kurokawa et al. ........... | 280/279 |

FOREIGN PATENT DOCUMENTS

JP 60-176876 9/1985

* cited by examiner

*Primary Examiner*—Lesley Morris
*Assistant Examiner*—Marc A Scharich
(74) *Attorney, Agent, or Firm*—Carrier, Blackman & Associates P.C.; William D. Blackman; Joseph P. Carrier

(57) ABSTRACT

A lightweight motorcycle frame is made with sufficient rigidity to minimize or avoid the occurrence of frame cracks, due to impacts on the frame caused by a harsh landing after a vehicle jump or the like. The motorcycle frame includes a head pipe, a pair of main frames extending rearwardly from the head pipe, and a down tube extending downwardly from a lower portion of the head pipe. The frame may include a forged reinforcing body for connecting the head pipe and the down tube, and the other frame components may be formed by casting. In this case, the other frame components include a portion of the head pipe, the main frames, the down tube, and the reinforcing frame, which may be integrally molded by aluminum casting. Where used, the reinforcing body may be secured to a front portion of an integrally cast frame body.

15 Claims, 18 Drawing Sheets

VIII

IX

REINFORCED MOTORCYCLE FRAME

CROSS-REFERENCE TO RELATED APPLICATIONS

The present invention claims priority under 35 USC 119 based on Japanese patent application No. 2005-221866, filed on Jun. 30, 2005. The subject matter of this priority document is incorporated by reference herein.

BACKGROUND OF THE INVENTION

1. Field of the Invention

The present invention relates to a motorcycle frame that is reinforced so as to be sufficiently rigid for use in extreme conditions, while being light in weight.

2. Description of the Background Art

In general, it is known to provide a motorcycle having frame components which include main frames and a down tube, where the main frames extend from a head pipe in a rearward direction of a body, and the down tube extends under this main frame and extends from the head pipe in a downward direction of the body.

For motorcycles having such frame components, it has been proposed that frame components, including a head pipe, a main frame, a down tube and the like, are integrally cast using light metal materials such as magnesium alloy in order to minimize vehicle body weight. Such a motorcycle is disclosed, for example, in Japanese Laid-open Patent Application No. Sho 60-176876.

In a motorcycle trial race, since there may be an event where a motorcycle drops, for example, through a distance of 10 meters in height, the motorcycle used for a motorcycle trial race is required to have enough strength to sustain impacts caused by such falls.

However, when a motorcycle is designed according to the convention of minimizing the weight of the motorcycle body, and when such a motorcycle is used for trial racing, it is necessary to stiffen respective frame components in the body portion to which a load is applied.

The present invention was made in consideration of the above described problem, and an object thereof is to provide a motorcycle frame, the rigidity of which is secured while maintaining a light frame weight.

SUMMARY

To solve the above described problem, a first illustrative embodiment of the present invention provides a reinforced motorcycle frame including a head pipe, a pair of main frames extending from a head pipe in a rearward direction of a body, and a down tube extending from the head pipe, under the main frames, in a lower direction of the body. The first embodiment of the invention is characterized in that a reinforcing body interconnecting the head pipe and the down tube is a member formed by forging, and other frame components, such as the down tube, are formed by casting.

According to this aspect of the invention, since the connection for the head pipe and the down tube is a forged member which is superior in strength and toughness relative to a casting, and other frame components such as the down tube are formed by casting, the strength of a reinforcing body, disposed at a so-called "under chin portion" of the head pipe and the down tube, is increased, while maintaining a frame that is light in weight. In addition, frame rigidity can be obtained which makes it possible to avoid or reduce the occurrence of frame cracks, due to impacts on the frame caused during a vehicle jump or the like. The frame components other than the reinforcing body, such as the down tube, may be integrally cast by a large-scale casting, so that labor saving can be achieved on welding operations during frame manufacturing.

Furthermore, another aspect of the present invention is directed to a motorcycle frame having frame components which include a pair of main frames attached to and extending rearwardly from the head pipe, a down tube extending from the head pipe under the main frames in the lower direction of the body, and a pair of lower pipes which extend rearwardly from the down tube. This aspect of the invention is characterized in that the main frames and the lower pipes, on respective left and right sides of the motorcycle frame, are interconnected by a pair of forged pivot plates, and other frame components are formed by casting.

According to this aspect of the invention, since the head pipe, the main frames, the down tube, and the lower pipes are cast members, and the main frames and the down tube are interconnected by the forged pivot plates, the strength of the pivot plates is increased, while maintaining a frame that is light in weight and sufficiently rigid. As a result, it is possible to minimize or avoid occurrence of frame cracks due to impacts on the frame, caused during a vehicle jump or the like. The head pipe, the main frames, the down tube, and the lower pipes are integrally cast by a large-scale casting, so that labor savings can be achieved on welding operations during frame manufacture.

In addition, another aspect of the present invention is directed to a motorcycle frame having frame components which include a head pipe, a pair of main frames attached to and extending rearwardly from the head pipe, a down tube extending from the head pipe under the main frames in the lower direction of the body, and a pair of lower pipes which extend rearwardly from the down tube. This aspect of the invention is characterized in that the down tube and the lower pipes are connected with a forged joint, and other frame components are formed by casting.

According to this aspect of the invention, since a connection joint connecting the down tube and the lower pipes is forged, providing a connection joint which is superior in strength and toughness relative to one which is cast, and since the other frame components are castings, the strength of the connection between the down tube and the lower pipes can be increased, while maintaining a frame that is light in weight and sufficiently rigid. As a result, it is possible to minimize or avoid occurrence of frame cracks due to impacts on the frame, caused during a vehicle jump or the like. Frame components other than the connection joint, such as the down tube, are integrally cast by a large-scale casting, so that labor savings can be achieved on welding operations during frame manufacture.

Moreover, still another aspect of the present invention is directed to a motorcycle frame having frame components which include a head pipe, a pair of main frames attached to and extending rearwardly from the head pipe, a down tube extending from the head pipe under the main frames in the lower direction of the body, and a pair of lower pipes which extend rearwardly from the down tube. This aspect of the invention is characterized in that at least two of a reinforcing body of the head pipe and the down tube, pivot plates connecting the main frames and the lower pipes, and a connection joint connecting the down tube and the lower pipes are forged members, and other frame components are castings.

According to this aspect of the invention, at least two of the reinforcing body for the head pipe and the down tube, the pivot plate connecting the main frames and the lower pipes, and the connection joint connecting the down tube and the lower pipes are forged members, which are superior in strength and toughness relative to castings, and other frame components, such as the down tube, are cast members. Owing to the strength of the forged components, rigidity of a frame can be sufficiently increased while maintaining the frame light in weight, to make it possible to minimize or avoid occurrence of cracks due to impacts on the frame, which may be caused during a vehicle jump or the like. Moreover, frame components other than the above, such as the down tube, are integrally cast by a large-scale casting, so that labor savings can be achieved on welding operations during frame manufacture.

In addition, another aspect of the present invention is directed to a motorcycle frame having frame components which include a head pipe, a pair of main frames attached to and extending rearwardly from the head pipe, and a down tube extending from the head pipe under the main frames in a lower direction of the body. This aspect of the invention is characterized in that of all the frame components, only the head pipe and the down tube are integrally cast, and a reinforcing body of a forging is welded to an under chin portion of the above integral cast component.

Furthermore, still another aspect of the present invention is directed to a motorcycle frame having frame components which include a head pipe, a pair of main frames attached to and extending rearwardly from the head pipe, a down tube extending from the head pipe under the main frames in a lower direction of the body, and a pair of lower pipes which extend rearwardly from the down tube. The invention is characterized in that of all the frame components, only the head pipe, the down tube, and a connection joint connecting the down tube and the lower pipes are integrally cast, and a forged reinforcing body is welded to the under chin portion of the above integral casting.

In these inventions, since the head pipe and the down tube are integrally cast, or, the head pipe, the down tube, and the connection joint connecting the down tube and the lower pipes are integrally cast, the manufacturing cost of the frame is reduced. In addition, since the forged reinforcing body is welded to the under chin portion of the above integral casting, rigidity of the under chin portion is increased.

Moreover, in the above respective inventions, the forgings and the castings, respectively, may be aluminum forgings and castings, or formed from an aluminum alloy, in order to save weight of the frame.

In the present invention, since a reinforcing body between a head pipe and a down tube is a forged member which is superior in strength and toughness as compared to a cast member, and since other frame constituting components are formed by casting, sufficient rigidity of the frame, which makes it possible to minimize or avoid the occurrence of frame cracks due to impacts on the frame, caused during a vehicle jump or the like, can be achieved while maintaining light frame weight and reducing costs.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the following description, words such as front, back, left, right, upper, and lower refer to directions with respect to a body of a motorcycle.

First Embodiment

Figure 3:
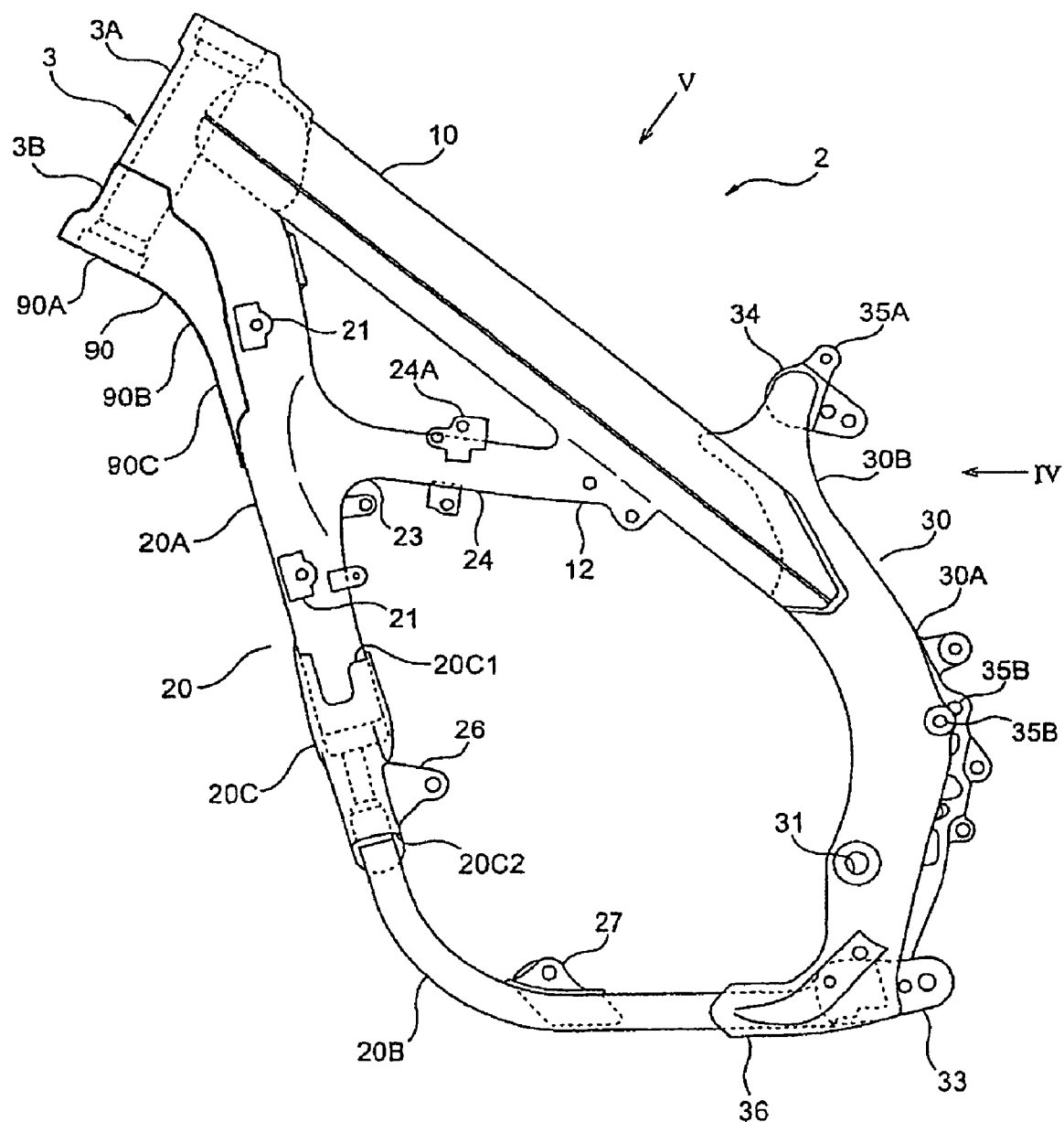
FIG. 3 is a side elevational view of the isolated body frame of the motorcycle of FIG. 2.
Figure 4:
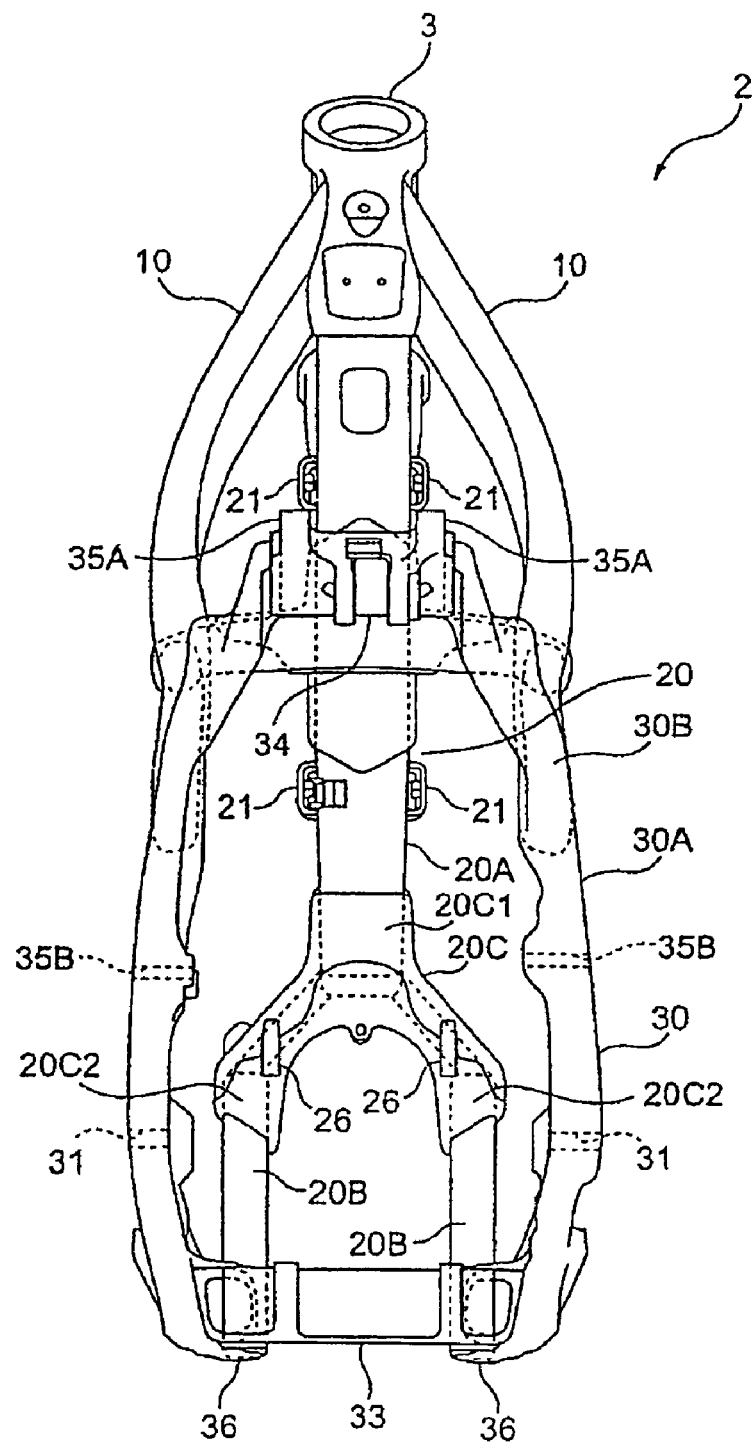
FIG. 4 is a rear view of the isolated body frame of the motorcycle of FIG. 2.
Figure 5:
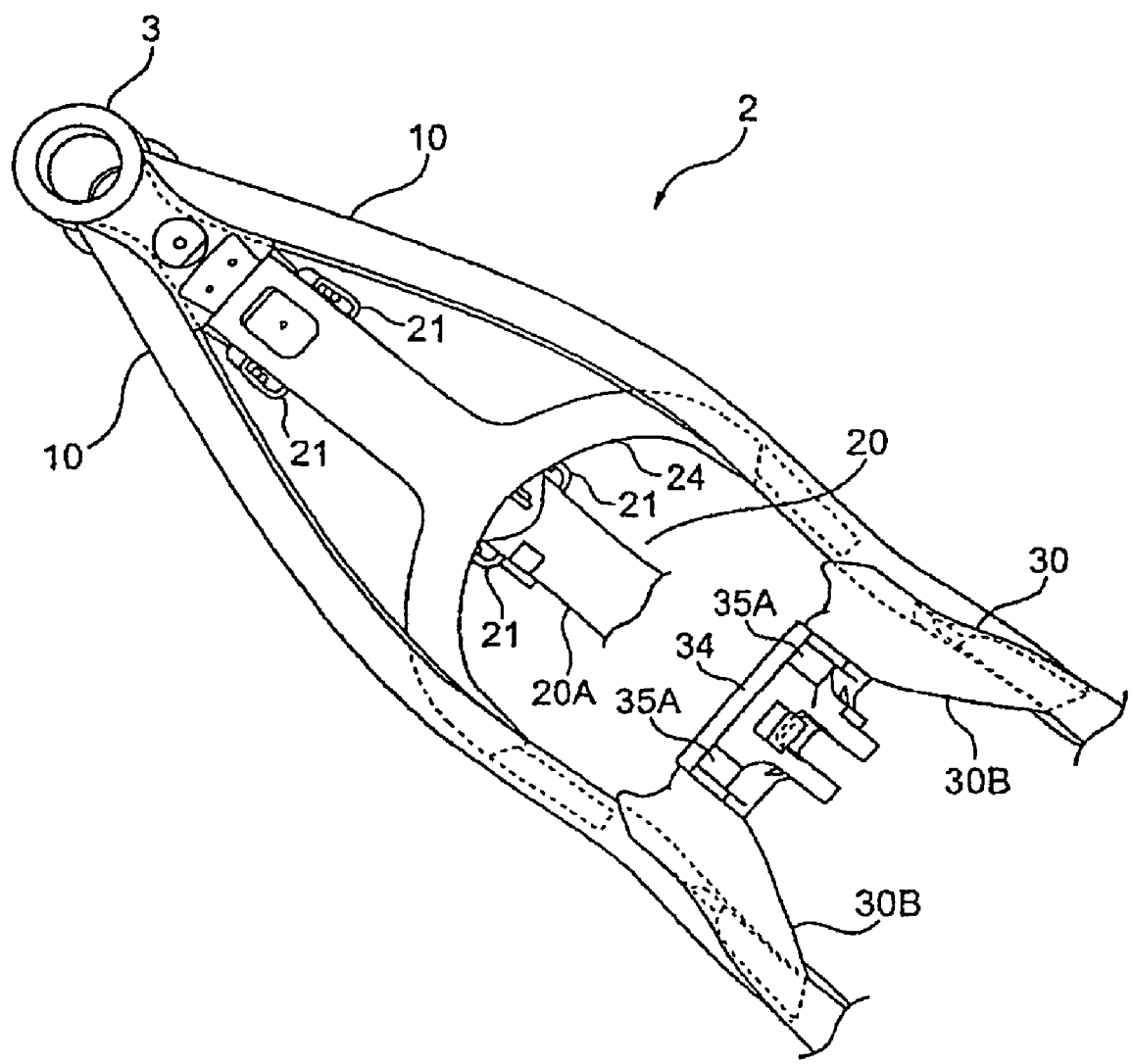
FIG. 5 is an oblique view from an upper direction of the isolated frame of the motorcycle of FIG. 2.

FIG. I is a side elevational view of a moto-cross type motorcycle 1, typically used for motocross racing which incorporates a first embodiment of the inventive body frame 2; FIG. 2 is a perspective view of an isolated body frame 2 of the moto-cross motorcycle of FIG. 1; FIG. 3 is a side elevational view of the body frame 2 of FIG. 2; FIG. 4 is a rear view of the body frame 2 of FIG. 2; and FIG. 5 is a view showing the isolated body frame 2 of FIG. 2 when obliquely viewed from an upper direction.

Figure 1:
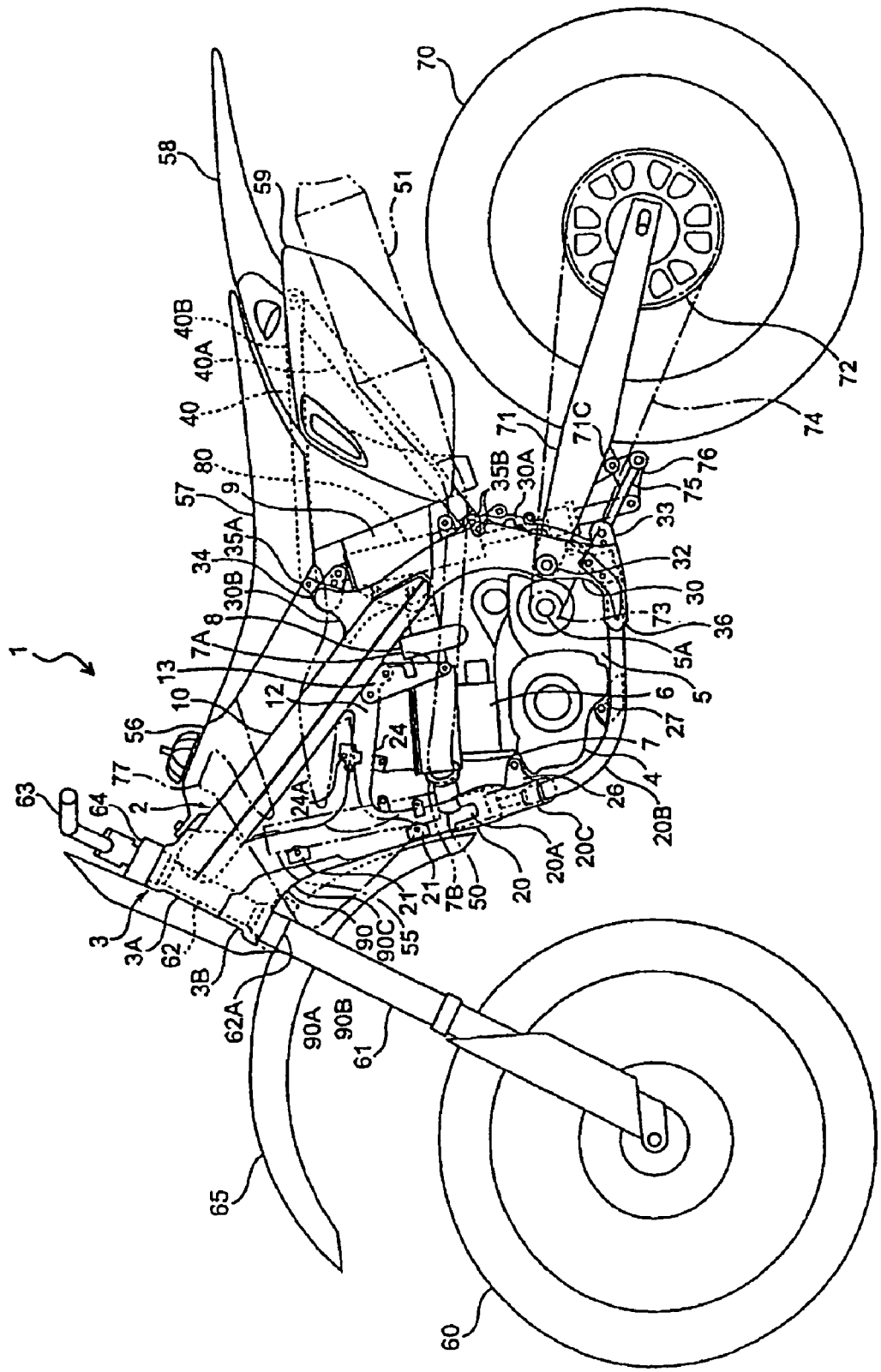
FIG. 1 is a side elevational view of a motorcycle incorporating a first embodiment of the inventive motorcycle body frame.
Figure 2:
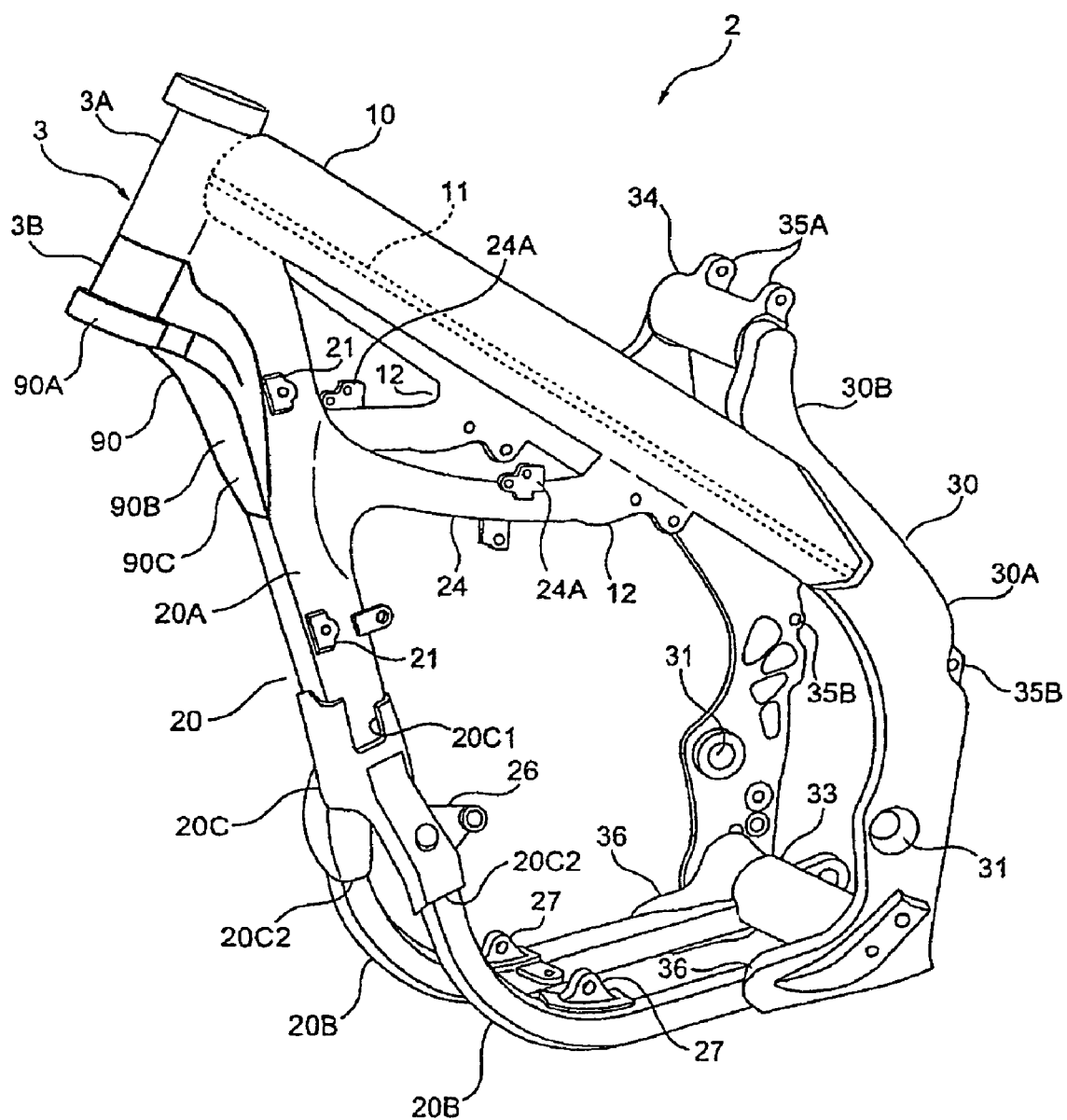
FIG. 2 is a perspective view of an isolated frame of the motorcycle of FIG. 1, showing an integrally cast body frame wherein a forged aluminum connector is welded to an under chin portion of the cast body frame.

Referring now to FIGS. 1-2, body frame 2 of the motorcycle 1 includes a pair of right and left main frames 10 which extend from a head pipe 3 in a rearward direction of the body. A down tube 20A extends under the main frames 10 from the head pipe 3 in a lower direction of the body, and a pair of right and left lower pipes 20B are continuous with the down tube 20A by means of a connection joint 20c and extend along a lower portion of the body in the rearward direction thereof. A pair of right and left pivot plates 30 connect the rear ends of the main frames 10 to respective rear ends of the lower pipes 20B. In addition, the body frame 2 includes a rear frame 40 (shown in phantom in FIG. 1), which extends from the pivot plate 30 in the rearward direction of the body. A down frame 20 includes the down tube 20A, the lower pipes 20B, and the connection joint 20c. The body frame 2 is formed as a cradle type frame, in which an engine 4 is suspended in a space surrounded by the main frames 10, the down tube 20A, and the pivot plate 30.

The motorcycle 1 includes a steering stem 62, which is pivotally inserted into the head pipe 3, and on which a pair of right and left front forks 61 is supported. A front wheel 60 is rotatably supported on a lower end of the pair of right and left front forks 6. A top bridge 64, to which a steering bar 63 is fixed, is connected to an upper end of the steering stem 62. A front fender 65 is fastened to a lower portion of a bottom bridge 62A of the steering stem 62. The above pair of main frames 10 is hollow, and is formed having a double hollow rectangular shaped cross section, and having stiffening ribs 11 inside. Engine support brackets 12 are provided on the lower surfaces of each respective main frame 10, and the engine 4 is supported on each of the brackets 12 through an engine hanger 13.

In addition, the down tube 20A is formed into a hollow structure of rectangular cross-section. On right and left sides of the down tube 20A, bolt fastening portions 21 are disposed at upper and lower positions with a space left therebetween, and are used for fastening a radiator 55 thereon. On a rear side of the down tube 20A, a reinforcing frame 24 of roughly U-shape is provided, and respective end portions of the reinforcing frame 24 are connected to the engine support brackets 12 of the main frames 10, respectively. The reinforcing frame 24 is provided with shroud-supporting brackets 24A. A shroud 77, which covers front, right and left sides of the body, is fastened to the shroud-supporting brackets 24A.

Thus, since there are a plurality of connection places at which the main frames 10 and the down tube 20A are operatively connected in the vicinity of the head pipe 3 and away from the head pipe 3, the strength of connection between the main frames 10 and the down tube 20A is enhanced.

The above described pair of lower pipes 20B are hollow tubes of square cross-section, which extend rearwardly from the connection joint 20c along a lower portion of the body. Rear ends of the respective lower pipes 20B are connected by welding to respective brackets 36, provided on adjacent curved portions 30A of the pivot plates 30. A pair of engine support bosses 27, which protrude upwardly, are integrally provided on roughly middle portions of the respective lower pipes 20B, and lower portions of the engine 4 are supported on the frame 2 via attachment to the engine support bosses 27.

The above described connection joint 20c (refer to FIGS. 2 and 3) is a hollow structure which includes a tube insertion socket 20C1, and two pipe insertion sockets 20C2 disposed in parallel with each other on the opposite side of the connection joint 20c relative to the tube insertion socket 20C1. A lower end of the down tube 20A is inserted into the tube insertion socket 20C1 from above (refer to FIGS. 2 and 4), and the tube insertion socket 20C1 and the down tube 20A are connected by welding while retaining the above insertion as it is shown. In addition, front end portions of the lower pipes 20B are respectively inserted into the insertion sockets 20C2, and the lower pipes 20B and the insertion sockets 20C2 are connected by welding while retaining the above insertion as it is shown. Furthermore, a pair of engine hangers 26 are integrally formed on the connection joint 20c, and front portions of the engine 4 are supported through the engine hangers 26.

The above described pivot plates 30 are solid, integrally-formed structures which include the curved portions 30A and extended portions 30B. The curved portions 30A are curved from the rear portions of the main frames 10 in the lower direction of the body, and the extended portions 30B extend integrally upwardly from the curved portions 30A to the upper direction of the body.

The curved portions 30A are formed having through-holes 31 passing through the thickness of the curved portions 30A in right and left directions of the body. A shaft 32 is inserted into and pivotally supported in the through-holes 31, and a front end portion of a swing arm or rear fork 71, on which a rear wheel 70 is rotatably supported, is supported on the shaft 32, in such a way that the rear fork can swing freely up and down. In addition, sprockets 72 and 73 are respectively disposed on the rear wheel 70 and an output shaft 5A of the engine 4. A drive chain 74 is wound around the sprockets 72 and 73, and power from the engine 4 is transmitted to the rear wheel 70 through the drive chain 74.

A bracket 33 for a rod is disposed at lower positions of the curved portions 30A. The bracket 33 also serves as a cross member of the pivot plates 30. One end of a rod 75 is rotatably connected to the bracket 33, and the other end thereof is connected to a connection body 76. A lower end of a rear shock absorber 80 is also connected to the connection body 76 and, thereby, movement in a rotation direction with respect to a connection supporting point 71C, at which the connection body 76 is connected to the rear fork, is suppressed. A rear suspension upper bracket 34, which also serves as a cross member, is disposed between the extended portions 30B, and an upper end of the rear shock absorber 80 is connected to the bracket 34. In addition, connection portions 35A and 35B for connecting the rear fork 71 to the pivot plates 30 are respectively formed in the curved portions 30A and the rear suspension upper bracket 34. Moreover, the rear ends of the down tube 20 are connected, through the brackets 36, to portions of the curved portions 30A, which are stiffened with the bracket 33.

A rear frame 40 includes a pair of right and left aluminum pipes 40A, which are connected to the connection portions 35A of the curved portions 30A and extended obliquely upward in the rearward direction of the body. The rear frame also includes a pair of right and left aluminum pipes 40B, which are connected to the connection portions 35B of the rear suspension upper brackets 34 and extended in the rearward direction. The aluminum pipes 40A and 40B are so constituted as to be connected to each other at their respective ends and a seat 57, a rear fender 58, and side covers 59 are disposed on those aluminum pipes 40A and 40B.

The engine 4 includes a crankcase 5, a cylinder block 6 protruding in a slightly upward direction from a front portion of the crankcase 5, and a cylinder head 7 connected to an upper portion of the cylinder block 6. The engine 4 is a single cylinder engine having one cylinder in the cylinder block 6. In the cylinder block 6, a piston reciprocates in the above described cylinder. A crankshaft, which is connected to the above piston through a connecting rod, and the output axis 5A of the above-mentioned engine 4 are rotatably supported on the crankcase 5, while, within the crankcase 5 are stored a clutch mechanism, a transmission mechanism, and the like which constitute a power transmission mechanism to be located between the above crankshaft and the output axis 5A.

In the cylinder head 7 are stored intake and exhaust valves, which open or close an intake and exhaust passage that communicate with cylinders in the cylinder block 6: An intake port 7A of the intake and exhaust passage is formed in the backside of the cylinder head 7. A carburetor 8 is connected to this intake port 7A, and an air cleaner box 9 is connected to the carburetor 8. An exhaust port 7B of the intake and exhaust passage is formed in a front surface of the cylinder head 7, and an exhaust pipe 50 is connected to the exhaust port 7B. The exhaust pipe 50 extends in the a forward direction from the exhaust port 7B, is curved laterally to the cylinder head 7, is extended in the rearward direction of the body, and then, is extended in the rearward direction of the body to be connected to an exhaust muffler 51 at an end portion thus extended. A radiator 55 for cooling the coolant water of the engine 4 is disposed in a position anterior to the cylinder head 7, a fuel tank 56 for supplying fuel to the above carburetor 8 is disposed above the cylinder head 7, and the seat 57 is disposed in a position posterior to this fuel tank 56.

The body frame 2 will now be described.

As shown in FIGS. 2 and 3, in the present embodiment, one portion 3A of the head pipe 3, the main frames 10, the down tube 20A, and the reinforcing frame 24 are integrally molded by a large scale aluminum casting. A connection portion 90 (hereinafter referred to as reinforcing body 90), shown by thick lines in the drawings, is connected to the frame 2, extends between the head pipe 3 and the down tube 20A, and is forged from aluminum. Other frame components, i.e. the above one portion 3A of the head pipe 3, the main frames 10, the down tube 20A, the reinforcing frame 24, as well as the lower pipes 20B, the connection joint 20c, the pivot plates 30, and the like are all aluminum castings. These aluminum castings may be, but are not limited to, those which are molded in a way of, for example, metal mold casting, die casting, or, further, hollow die casting. In these castings, aluminum alloys are used.

On the other hand, an aluminum forging has higher strength and toughness than an aluminum casting. The aluminum forging may be manufactured in a way of die forging by using an aluminum alloy for forging, for example, a high-strength alloy, a heat-resistant alloy, an anticorrosion alloy, or the like, and also may be a cold forging. Here, the aluminum used in the forging process includes pure aluminum as well as aluminum alloy.

The above described reinforcing body 90 is disposed at a so-called "under chin portion" of the aluminum casting, and extends continuously from a lower portion of the head pipe 3 to a front end of the down tube 20A, covering an underside surface of the front end of the down tube 20A. The reinforcing body 90 is an aluminum forging, whereby it is higher in strength and toughness than an aluminum casting. The reinforcing body 90 integrally includes a pipe portion 90A constituting the other portion 3B of the head pipe 3, and an extended portion 90B of a solid structure extending from the pipe portion 90A along a lower surface of the down tube 20A. As shown in FIG. 3, the pipe portion 90A and extended portion 90B are joined on their upper surfaces by welding or the like to the head pipe 3 and the down tube 20A, with no space interposed therebetween. In addition, the lower surfaces of the pipe portion 90A and the extended portion 90B are formed into a curved surface 90C. The curved surface 90C is smoothly curved toward the down tube 20A when viewed from a side of a body. Thus, when the reinforcing body 90 is subjected to an external force from a lower portion of the head pipe, the external force is dispersed to the down tube 20A so that the strength of the connection portion between the head pipe 3 and the down tube 20A is enhanced.

In the embodiment, the one portion 3A of the head pipe 3, the main frames 10, the down tube 20A, and the reinforcing frame 24 are integrally molded by a large scale aluminum casting, and the reinforcing body 90 of the aluminum forging is welded to the under chin portion of the above described large aluminum casting thus formed; and, therefore, welding for this large casting is accomplished at a single location, and it becomes unnecessary to perform welding on a connection portion between the one portion 3A of the head pipe 3 and the main frames 10, a connection portion between the one portion 3A of the head pipe 3 and the down tube 20A, a connection portion between the down tube 20A and the reinforcing frame 24, and a connection portion between the reinforcing frame 24 and the main frames 10, so that labor savings on welding operations can be achieved.

Furthermore, since a connection portion between the head pipe 3 and the down tube 20A includes the reinforcing body 90, which is an aluminum forging superior in strength and toughness to aluminum casting, the strength of the connection portion between the head pipe 3 and the down tube 20A is increased more than in the case where the entire body frame 2 is made of aluminum casting. In this case, when the frame body drops from a height of 10 meters, jumps a height of 10 meters, or is subject to other equivalent operating conditions, the above described reinforcing body 90 receives an impact force which is transmitted from the front wheel 60 to the body frame 2 through the front fork 61 and the bottom bridge 62A and, thus, a frame stiffness can be achieved which makes it possible to avoid occurrence of cracks due to the impact force.

Furthermore, in the present invention, only the above described reinforcing body 90 is a component constituted with the aluminum forging. The other components which form the body frame 2, for example, the one portion 3A of the head pipe 3, the main frames 10, the down tube 20A, the pivot plates 30, and the like, are the aluminum castings, the manufacturing cost of which is lower than that of the aluminum forgings. Therefore, it is possible to secure rigidity of a frame while retaining the light weight of the frame, to provide a frame for which the manufacturing cost is low, and, further, to enhance a degree of freedom of a frame shape since the large casting is adopted.

Second Embodiment

FIGS. 6 to 9 show. a second embodiment of the inventive body frame 2.

In the second embodiment, only a pair of right and left pivot plates 300 (shown by thick lines in the drawings), which connect the rear ends of the main frames 10 and those of the down tube 20, are aluminum forgings, and other frame components are aluminum castings. The constitution of the frame 2 other than the above are the same as those described in the first embodiment, hence the description thereof is omitted.

Figure 6:
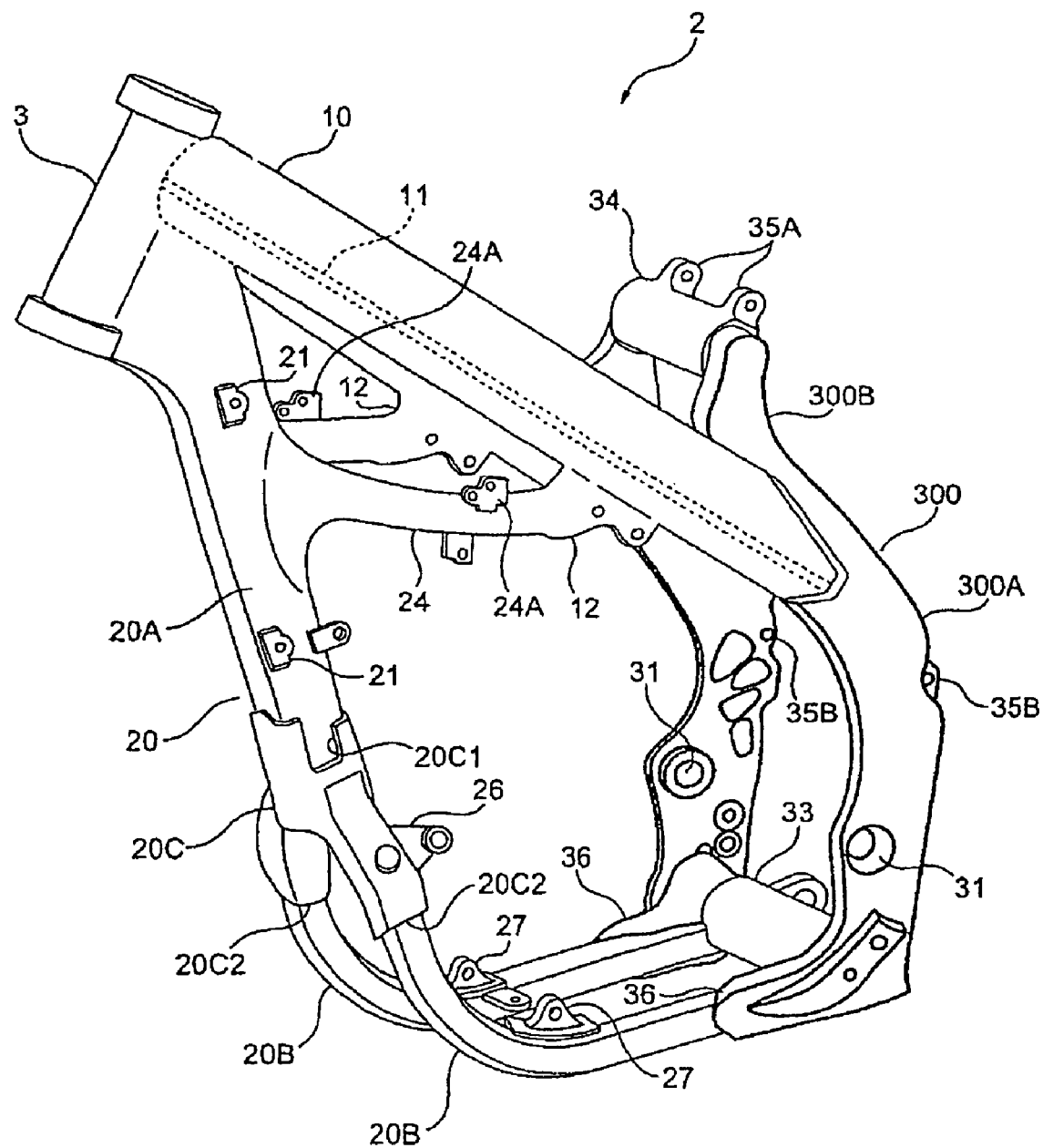
FIG. 6 is a perspective view of an isolated frame of a second embodiment of the inventive motorcycle frame showing an integrally cast body frame wherein forged aluminum pivot plates are welded to a rear end of the cast body frame.
Figure 7:
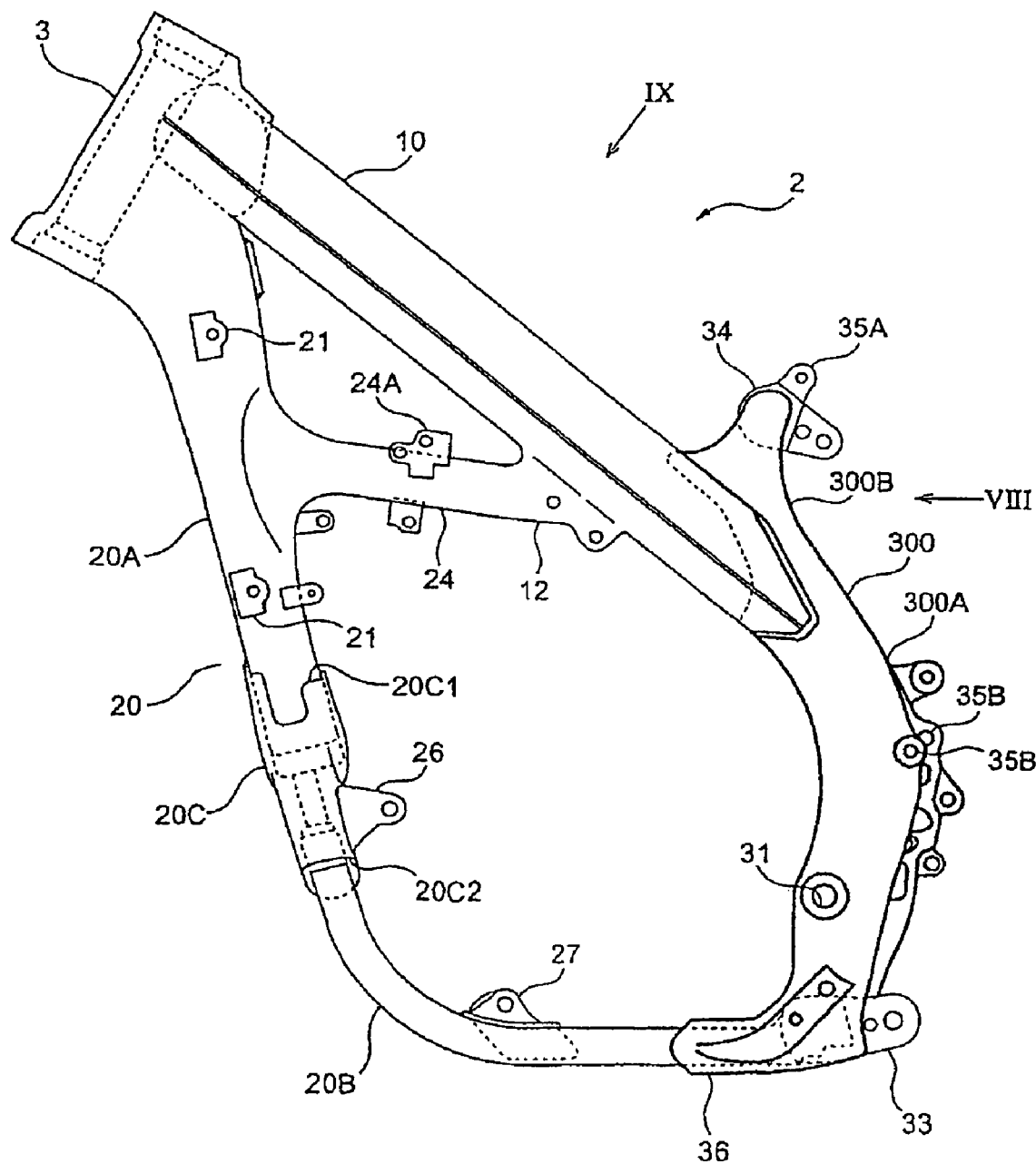
FIG. 7 is a side elevational view of the isolated body frame of the motorcycle of FIG. 6.

As shown in FIGS. 6 and 7, the pivot plates 300 are formed into solid structures that integrally include curved portions 300A and extended portions 300B. The curved portions 300A are curved in the lower direction of the body, and the extended portions 300B extend integrally upward from the curved portions 300A. Ends of the curved portions 300A and the lower surfaces of the extended portions 300B are connected by welding to the rear ends of the main frames 10.

Figure 8:
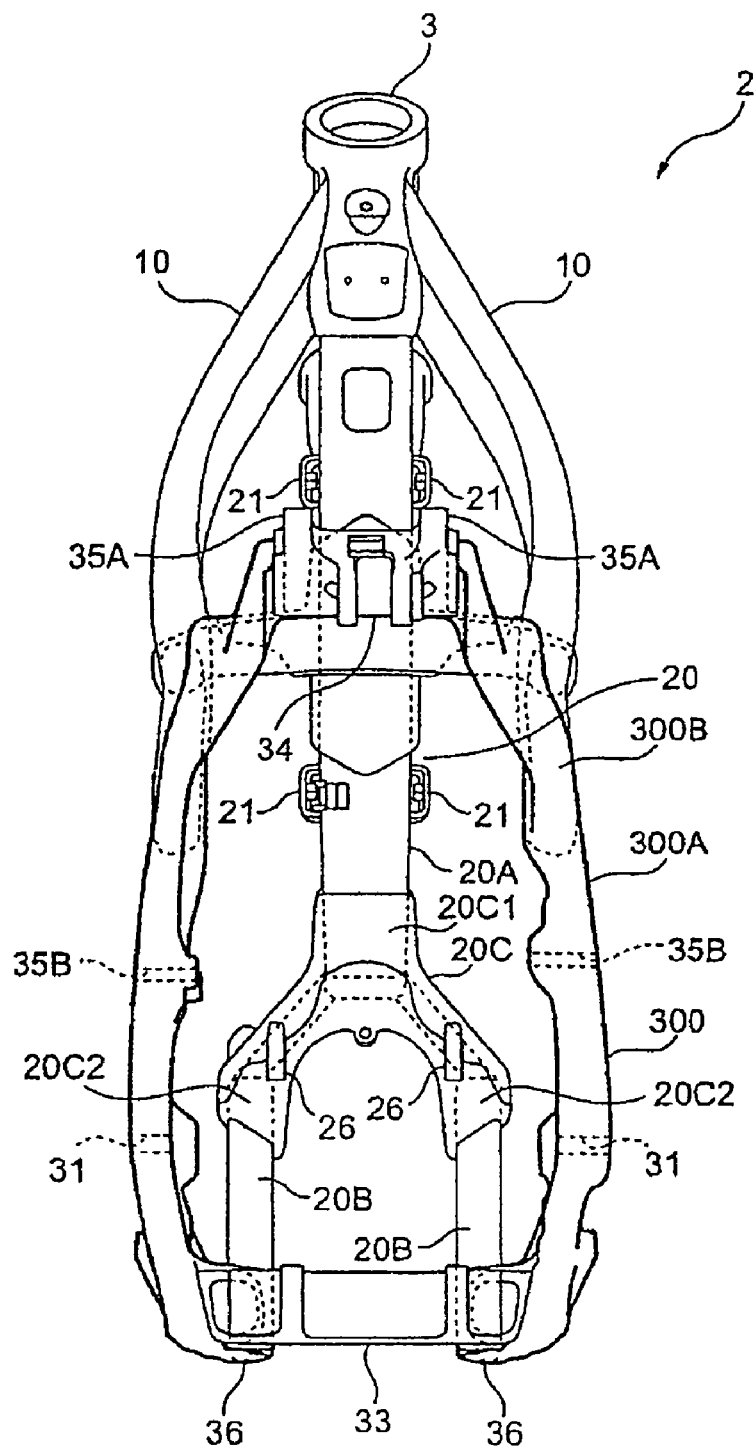
FIG. 8 is a rear view of the isolated body frame of the motorcycle of FIG. 6.

Through-holes 31 are formed in the curved portions 300A. The through holes 31 pass through the curved portion 300A in the right and left directions of the body. As shown in FIG. 1, the front ends of a rear fork 71, on which the rear wheel 70 is rotatably supported, are supported in a freely up-and-down swingable manner on the shaft 32 in the through-holes 31. In addition, as shown in FIG. 8, a bracket 33 for a rod, which also serves as a cross member, is disposed between respective lower portions of the curved plates 300A. As shown in FIG. 1, one end of a rod 75 is rotatably connected to the bracket 33. The other end of the rod 75 is connected to a connection body 76, which is also connected to a lower end of a rear shock absorber 80. As a result, movement is suppressed in a rotational direction with respect to a connection supporting point 71 C, at which the connection body 76 is connected to the rear fork 71.

Figure 9:
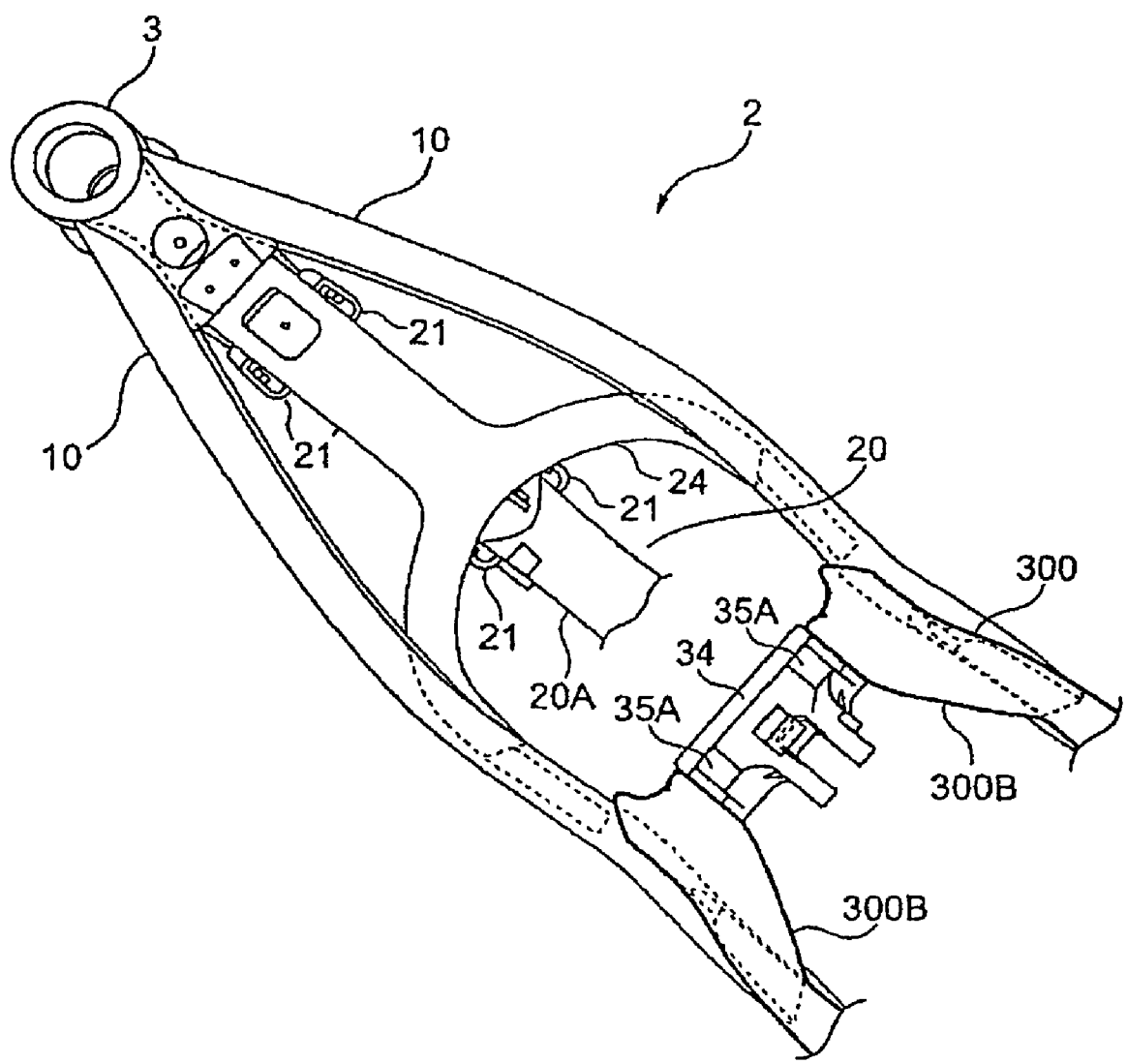
FIG. 9 is an oblique view from an upper direction of the isolated frame of the motorcycle of FIG. 6.

As shown in FIG. 9, a rear suspension upper bracket 34, which also serves as a cross member, is disposed between the extended portions 300B. An upper end of the rear shock absorber 80 is connected to the bracket 34 as in FIG. 1.

In addition, as shown in FIGS. 6 and 7, connection portions 35A and 35B are connected to the bracket 34 and the curved portions 300A, and forward ends of aluminum pipes 40A and 40B are respectively connected to the connection portions 35A and 35B as in FIG. 1. The rear frame 40 is thereby supported on the pivot plates 300.

In a second embodiment hereof, the body frame 2 does not include the reinforcing body 90 of the aluminum forging described in the first embodiment; the head pipe 3, the main frames 10, the down tube 20A, and the reinforcing frame 24 are integrally molded by a large scale aluminum casting; and other frame components other than the pivot plates 300, that is, the lower pipe 20B, the connection joint 20c, and the like are all aluminum castings.

In the second embodiment, since the pivot plates 300 are the aluminum forgings, which are superior in strength and toughness, the strength thereof where the rear fork 71 is rotatably supported is increased more than it would be in a situation where all the components of the body 2 are aluminum castings. In this case, when the body drops from a height of 10 meters, or jumps a height of 10 meters, or is subject to equivalent operating conditions, the pivot plates 300 receive an impact force which is transmitted from the rear wheel 70 to the body frame through the rear fork 71, so that a frame stiffness can be obtained which makes it possible to minimize or avoid occurrence of cracks due to impact force.

Moreover, in the second embodiment of the present invention, only the above described pivot plates 300 are aluminum forgings, and the remaining components of the body frame 2, that is, the head pipe 3, the main frames 10, the down tube 20A, and the like, are aluminum castings, a manufacturing cost of which is lower than that of the aluminum forging. Thus, it is possible to secure rigidity of a frame while retaining a light weight frame, to obtain the frame at a low manufacturing cost, and, further, to enhance a degree of freedom of a frame shape since the large casting is adopted.

Third Embodiment

Figure 10:
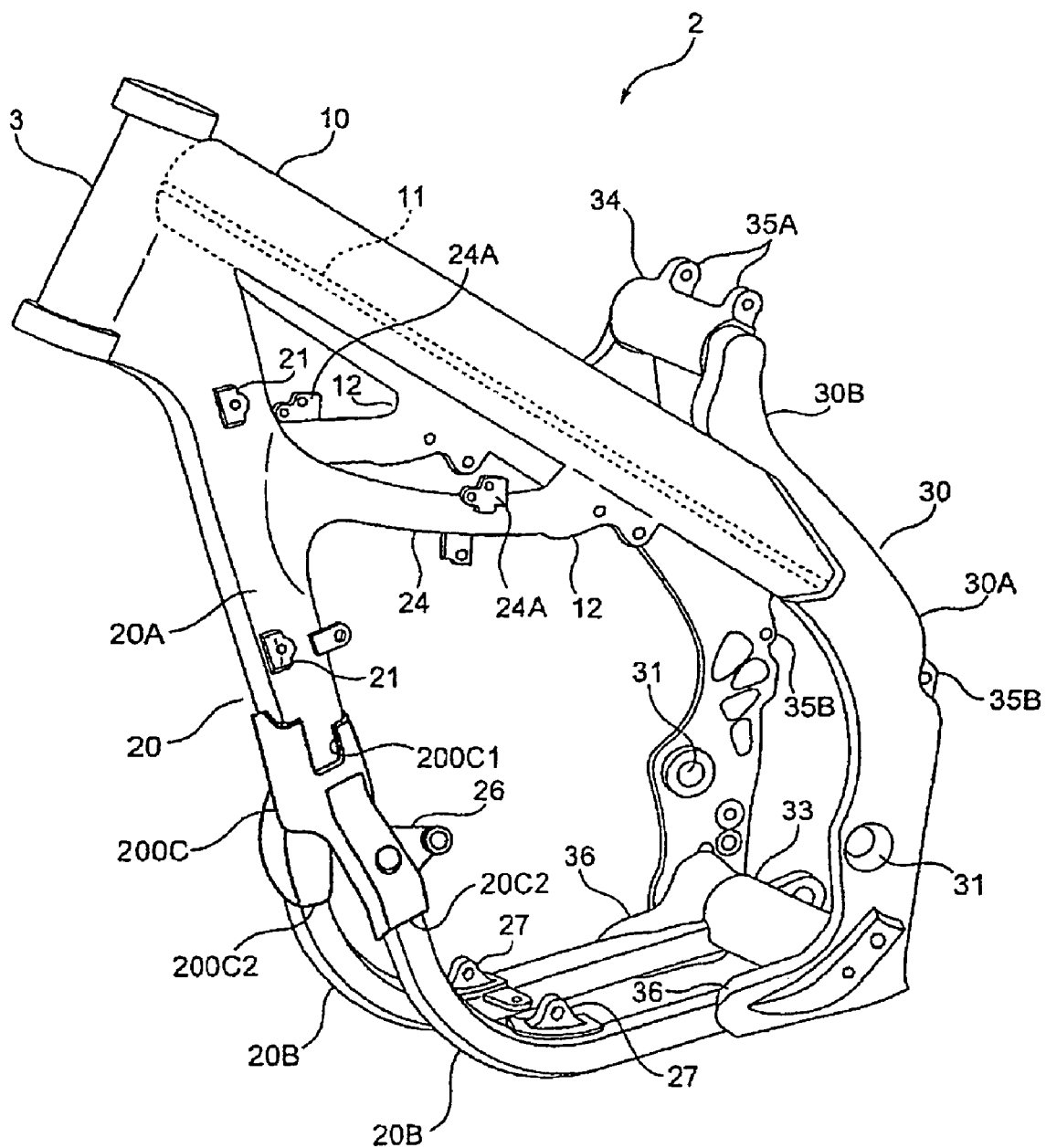
FIG. 10 is a perspective view of an isolated frame of a third embodiment of the inventive motorcycle frame showing an integrally cast body frame wherein a forged aluminum joint is welded between the down tube and the lower pipes of the cast body frame.
Figure 11:
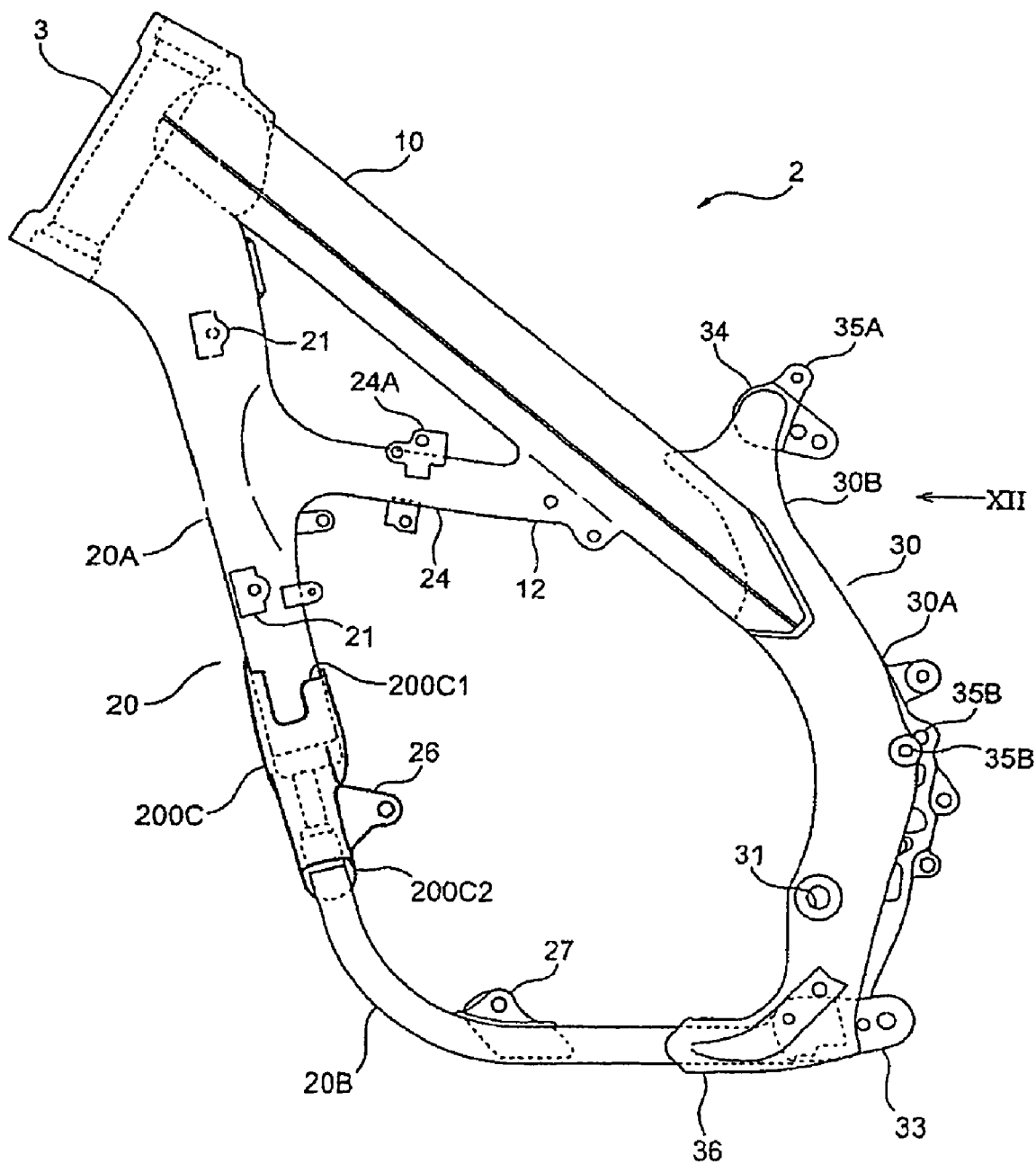
FIG. 11 is a side elevational view of the isolated body frame of the motorcycle of FIG. 10.
Figure 12:
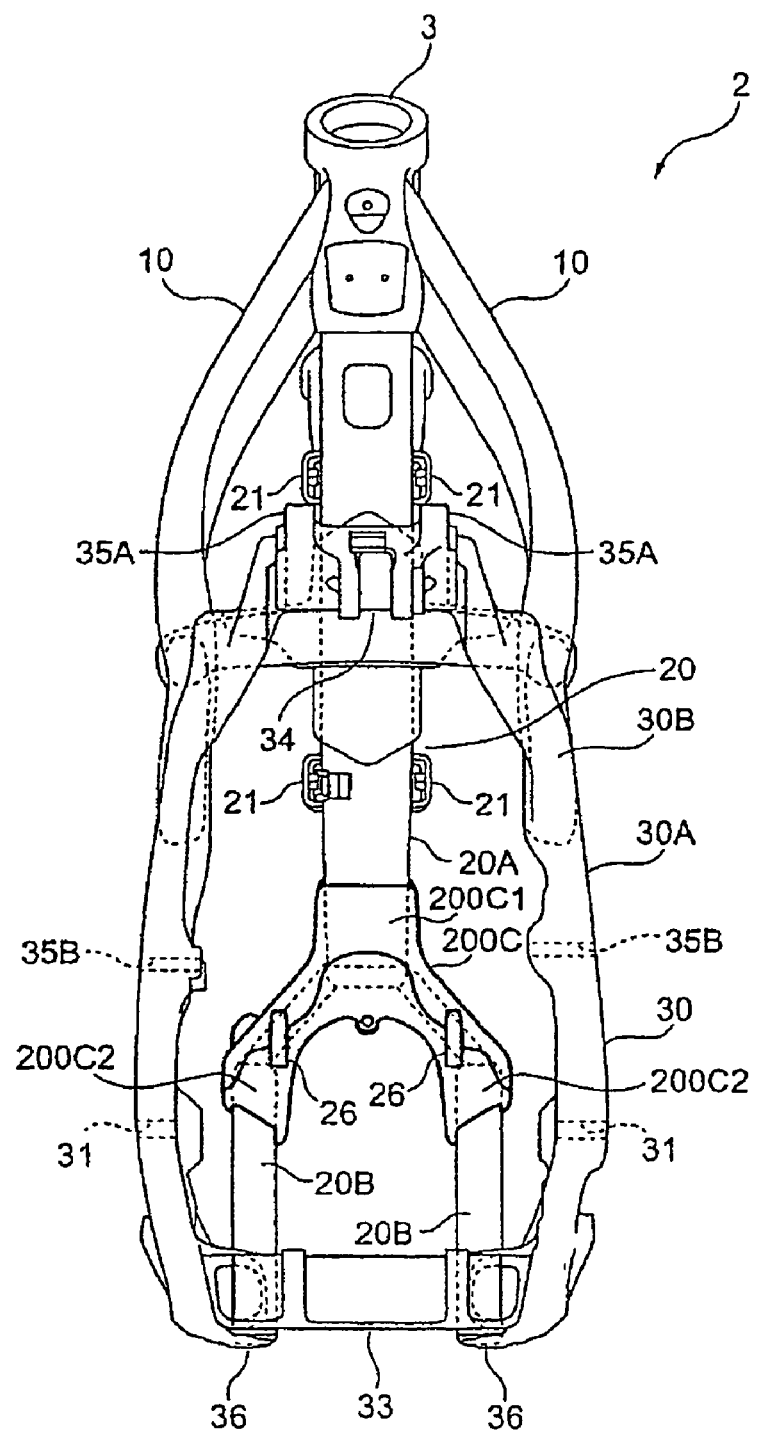
FIG. 12 is a rear view of the isolated body frame of the motorcycle of FIG. 10.

FIGS. 10 to 12 show a third embodiment of the inventive body frame 2.

In the third embodiment, only a connection joint 200C (shown by thick lines in the drawings) for connecting the down tube 20A and the lower pipes 20B is an aluminum forging, and other frame constituting components are aluminum castings. The constitution of the frame 2 other than the above are the same as those described in the first embodiment, hence the description thereof is omitted.

As shown in FIGS. 10 and 11, the above described joint 200C is a hollow structure which includes a tube insertion socket 200CI and two pipe insertion sockets 200C2. The two pipe insertion sockets 200C2 are disposed in parallel with each other, on an opposite side of the connection joint 200C relative to the tube insertion socket 200C1. As shown in FIG. 12, a lower end of the down tube 20A is inserted into the tube insertion socket 200CI, and the tube insertion socket 200CI and the down tube 20A are connected to each other by welding while retaining the above insertion as it is shown. In addition, front end portions of the pair of lower pipes 20B are respectively inserted into the above insertion sockets 200C2, and the respective lower pipes 20B and the insertion sockets 200C2 are connected by welding while retaining the above insertion as it is shown. Moreover, as shown in FIG. 11, the engine hangers 26 are integrally disposed on the connection joint 200C, and front portions of the engine 4 are supported through the engine hangers 26.

In addition, the third embodiment of the body frame 2 does not include the reinforcing body 90 of the aluminum forging described in the first embodiment. Instead, in this third embodiment, the head pipe 3, the main frames 10, the down tube 20A, and the reinforcing frame 24 are integrally molded by a large scale aluminum casting; and other frame components other than the connection joint 200C, that is, the lower pipes 20B, the pivot plates 30, and the like are all aluminum castings.

In this third embodiment, since the connection joint where the down tube 20A and the lower pipes 20B are connected is an aluminum forging, which is superior in strength and toughness to that of an aluminum casting, the strength of connection between the down tube 20A and the lower pipes 20B is increased to be more than that of the case in which the entire body frame 2 is made of an aluminum casting. In this case, when the frame body drops (when landing after a jump, or the like), the connection joint 200C receives an impact force acting on the down tube 20A and the lower pipes 20B, so that a frame stiffness can be obtained which makes it possible to minimize or avoid occurrence of cracks due to the impact force.

Furthermore, in this third embodiment of the present invention, only the above described joint 200C is a forged aluminum component, and other components constituting the body frame 2, i.e. the head pipe 3, the main frames 10, the down tube 20A, the pivot plates 30, and the like, are constituted with the aluminum castings, a manufacturing cost of which is lower than that of the aluminum forging. Thus, as in the above described respective embodiments, it is possible to secure rigidity of the frame while maintaining a frame which is light in weight, obtain the frame having low manufacturing costs, and, further, to enhance a degree of freedom of a frame shape since the large casting is adopted.

Fourth Embodiment

Figure 13:
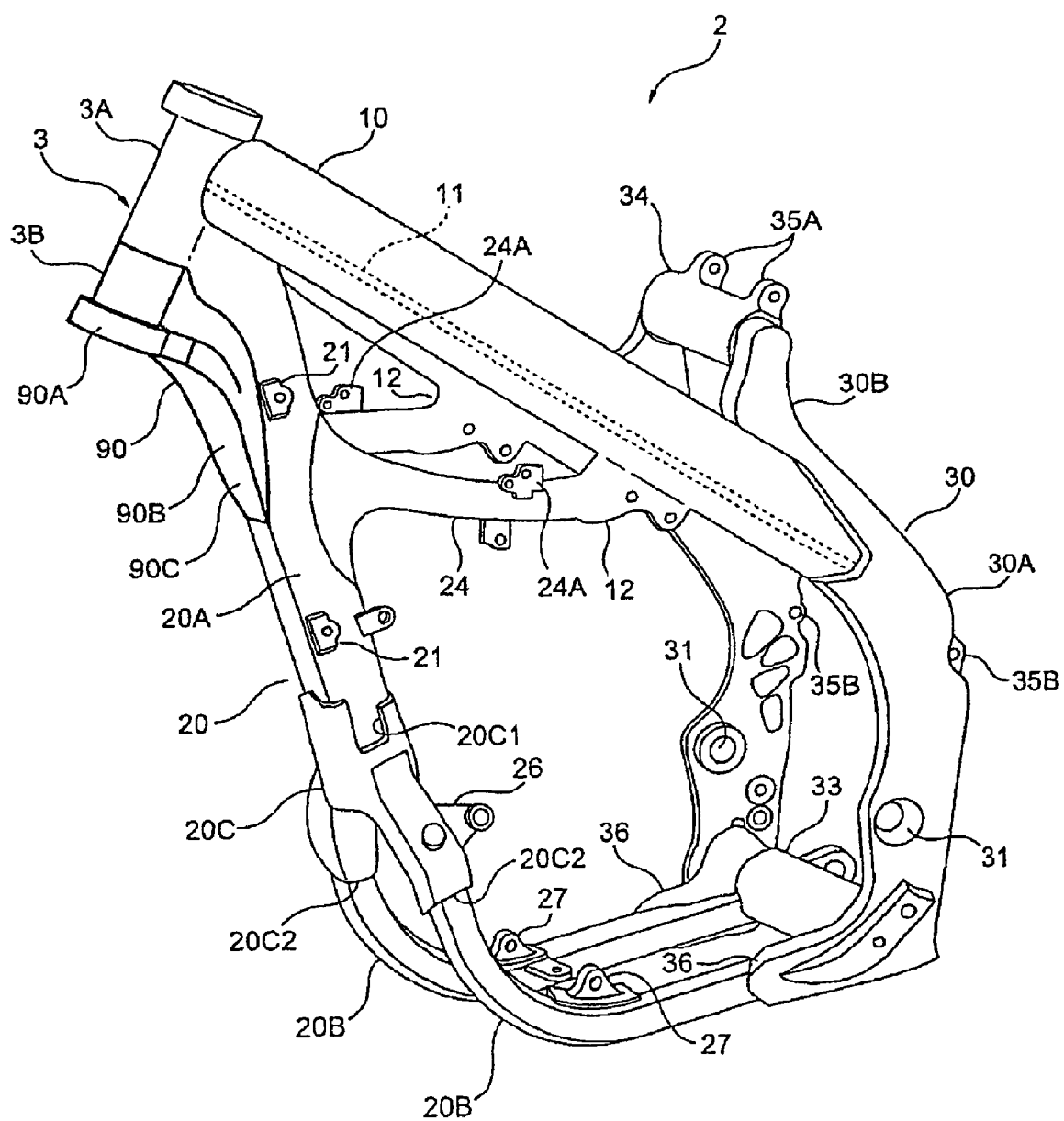
FIG. 13 is a perspective view of an isolated frame of a fourth embodiment of the inventive motorcycle frame showing a partially integrally cast body frame wherein a forged aluminum connector is welded to an under chin portion of the cast body frame.

FIG. 13 shows a fourth embodiment of the inventive body frame 2.

In the fourth embodiment, a frame 2 is constituted in such a way that the one portion 3A of the head pipe 3 and the down tube 20A are cast integrally together as a single unit. The other respective frame components, such as the main frames 10, which are also castings, are welded to the integral casting. The reinforcing body 90 of an aluminum forging, which is superior in strength and toughness to that of an aluminum casting, is welded to an under chin portion of the above integral casting. In this constitution, since the one portion 3A of the head pipe 3 and the down tube 20A are integrally cast, a manufacturing cost is reduced; and, in addition, since the reinforcing body 90 of the forging is welded to the under chin portion of the above integrally casting, rigidity of the under chin portion is increased.

Furthermore, in this fourth embodiment, only the above described reinforcing body 90 is an aluminum forging, and other components constituting the body frame 2, that is, the head pipe 3, the main frames 10, the down tube 20A, the pivot plates 30, and the like, are aluminum castings. As a result, the manufacturing cost of the other components is lower than that of aluminum forgings. Thus, as in the above described respective embodiments, it is possible to secure rigidity of a frame while retaining a light weight frame, to obtain the frame at a low manufacturing cost, and, further, to enhance a degree of freedom of a frame shape, since a large-scale casting is adopted.

Fifth Embodiment

Figure 14:
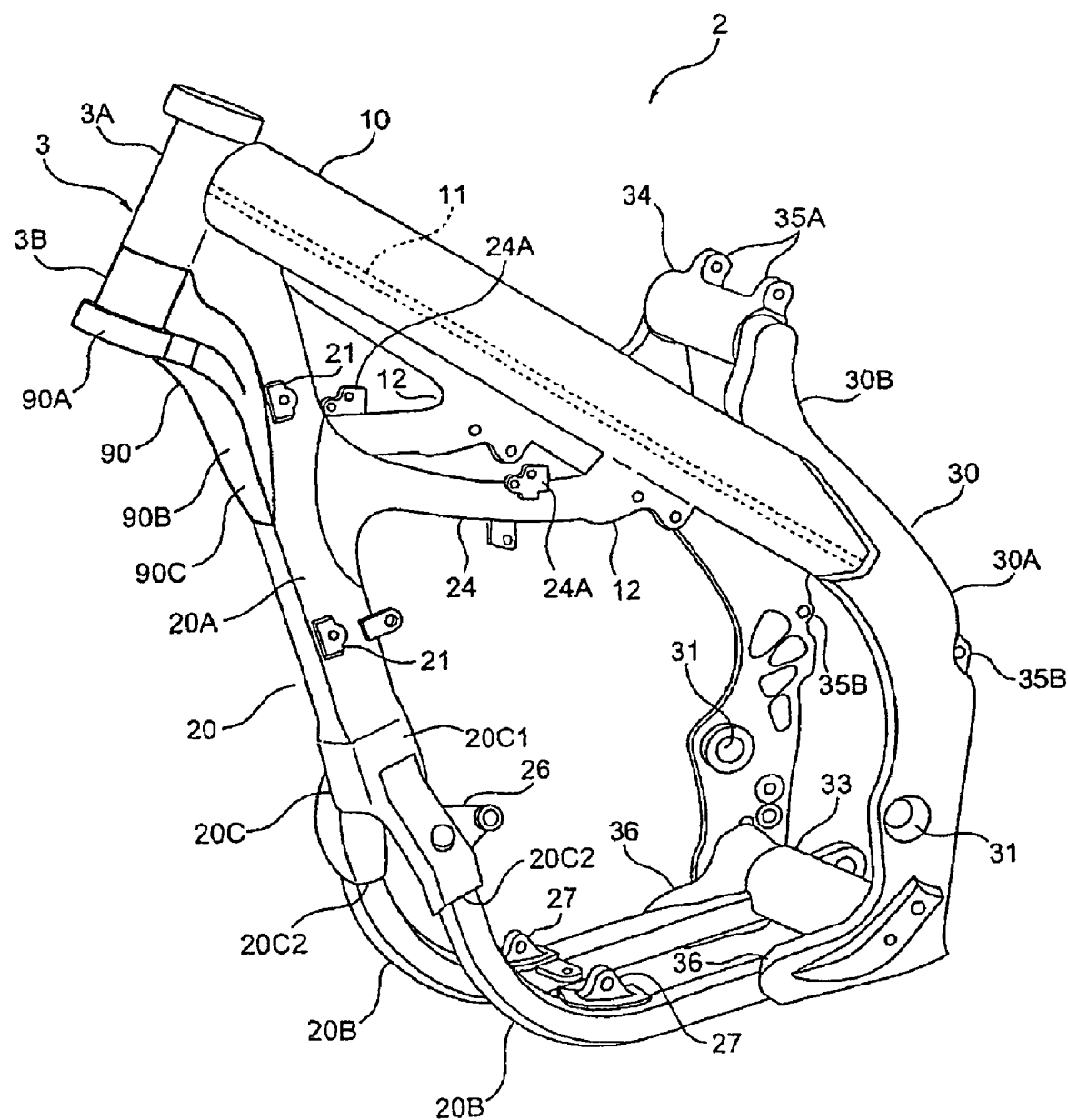
FIG. 14 is a perspective view of an isolated frame of a fifth embodiment of the inventive motorcycle frame showing a partially integrally cast body frame wherein a forged aluminum connector is welded to an under chin portion of the cast body frame.

FIG. 14 shows a fifth embodiment of the inventive body frame 2.

In the fifth embodiment, a frame 2 is constituted in such a way that the one portion 3A of the head pipe 3, the down tube 20A, and the connection joint 20c connecting the down tube 20A and the lower pipes 20B are cast integrally together as a single unit. The remaining respective frame components such as the main frames 10, which are also castings, are welded to the integral casting. The reinforcing body 90 of an aluminum forging, which is superior in strength and toughness to an aluminum casting, is welded to an under chin portion of the above integral casting. In this frame according to the fifth embodiment hereof, since the one portion 3A of the head pipe 3, the down tube 20A, and the connection joint 20c are integrally cast, the manufacturing cost thereof is reduced. In addition, since the forged aluminum reinforcing body 90 is welded to the under chin portion of the above integrally casting, rigidity of the under chin portion is further increased.

Furthermore, in this embodiment, only the above described reinforcing body 90 is an aluminum forging, and other components constituting the body frame 2, that is, the head pipe 3, the main frames 10, the down tube 20A, the pivot plates 30, and the like are aluminum castings. Thus, a manufacturing cost of the other components constituting the body frame 2 is lower than that of the aluminum forgings; and, thus, it is possible to secure rigidity of the frame, while maintaining a frame that is light in weight, to obtain a frame having a low manufacturing cost, and, further, to enhance a degree of freedom of a frame shape since the large-scale casting is adopted.

As described above, although the present invention is described based on a few embodiments, it is obvious that the present invention is not limited to the above descriptions. For example, in the above embodiments, the descriptions are respectively given for the cases where the connection portion between the head pipe 3 and the down tube 20A is the forged aluminum reinforcing body 90, where the pivot plates 300 are aluminum forged components, or where the connection joint 200C is an aluminum forged component. However, at least two of those described above may be constituted with the aluminum forgings, and other frame constituting components may be constituted with the aluminum castings. In this case, rigidity of a frame is, further increased. Since the pivot plates 300 and the connection joint 200C are essential components for the body frame 2, the rigidity of the frame can be increased without increasing number of components.

Figure 15:
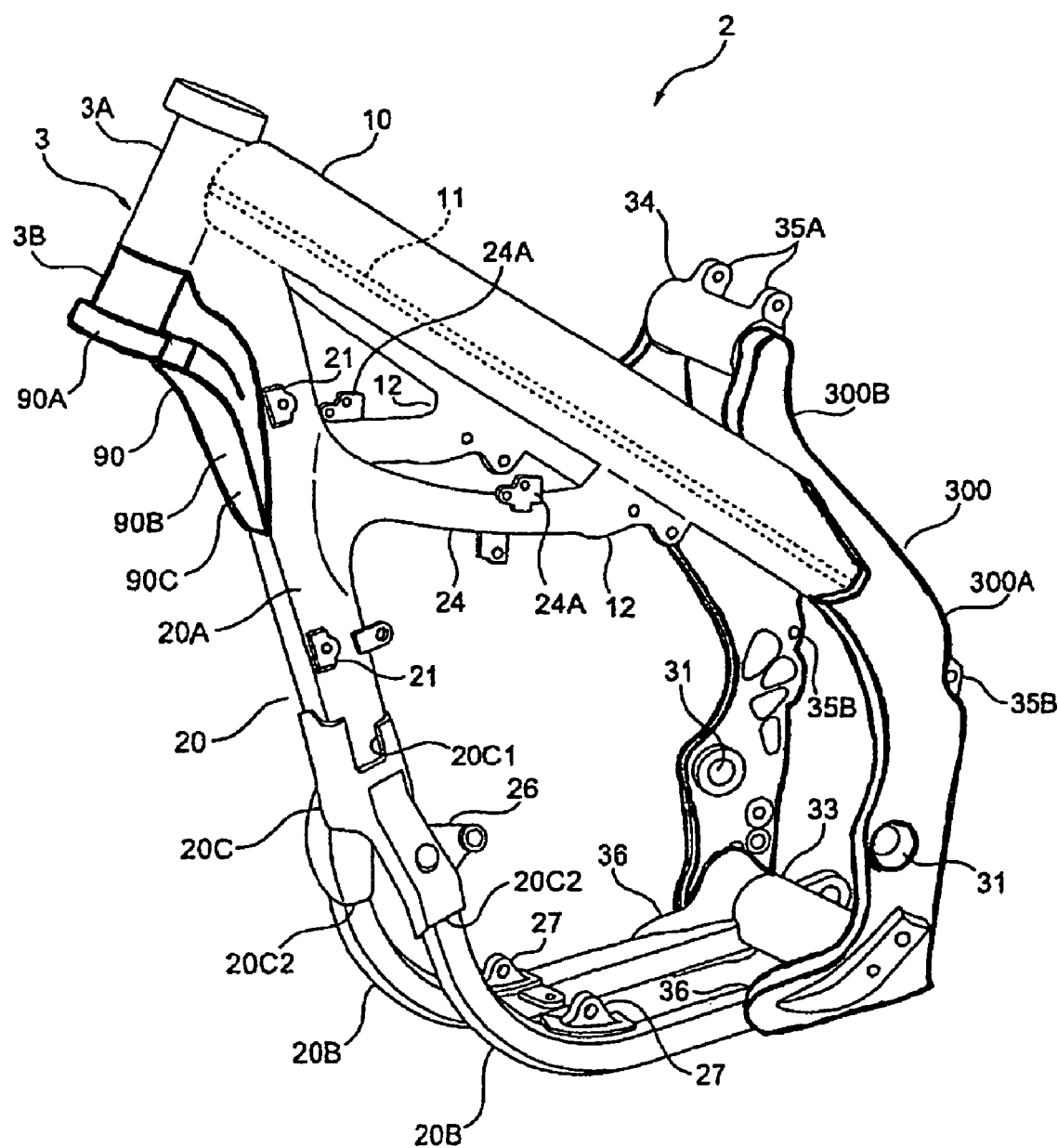
FIG. 15 is a perspective view of an isolated frame of a sixth embodiment of the inventive motorcycle frame showing an integrally cast body frame in which a forged aluminum connector is welded to an under chin portion of the cast body frame and forged aluminum pivot plates are welded to a rear end of the cast body frame.
Figure 16:
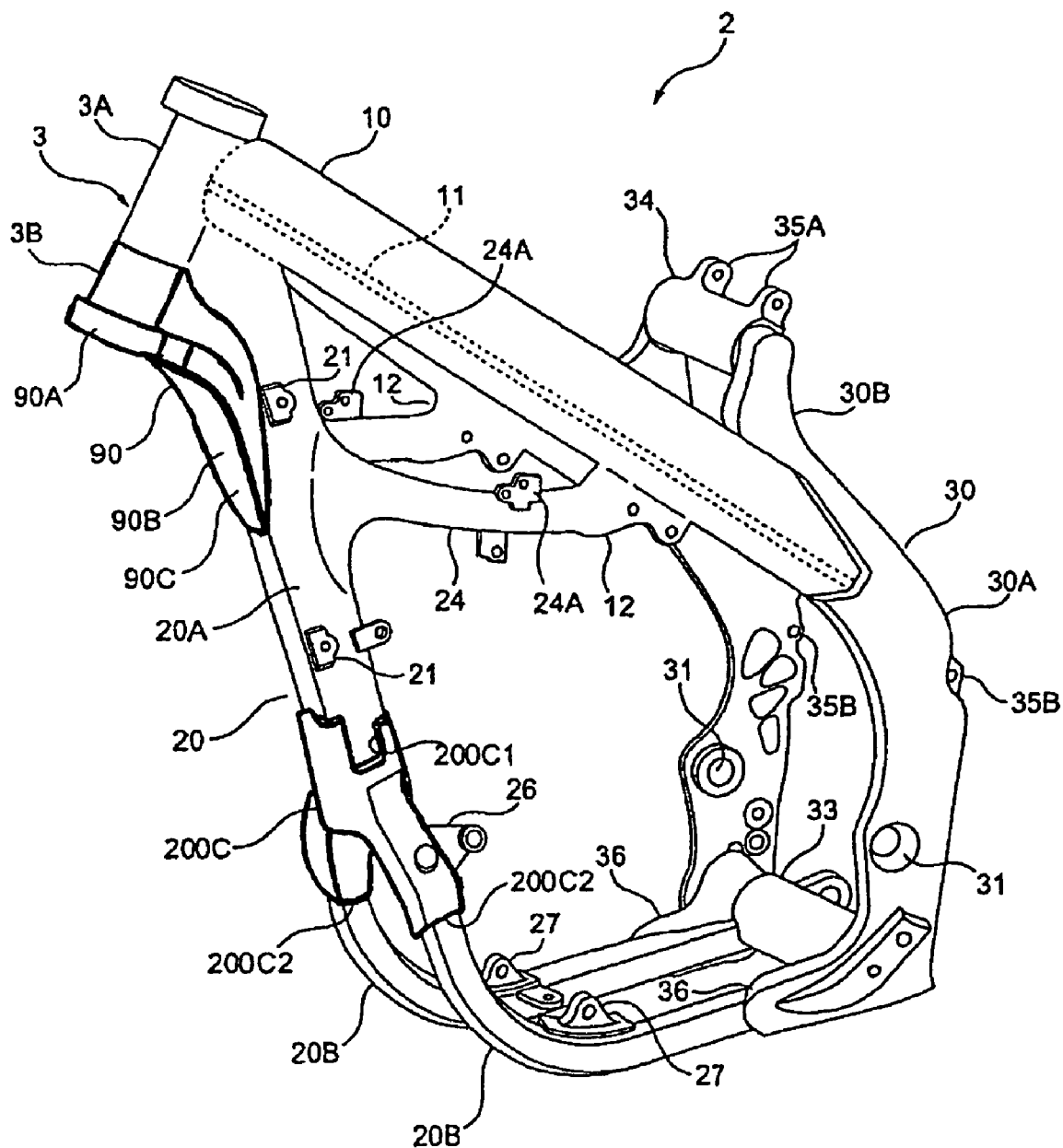
FIG. 16 is a perspective view of an isolated frame of a seventh embodiment of the inventive motorcycle frame showing an integrally cast body frame in which a forged aluminum connector is welded to an under chin portion of the cast body frame and a forged aluminum joint is welded between the down tube and the lower pipes of the cast body frame.
Figure 17:
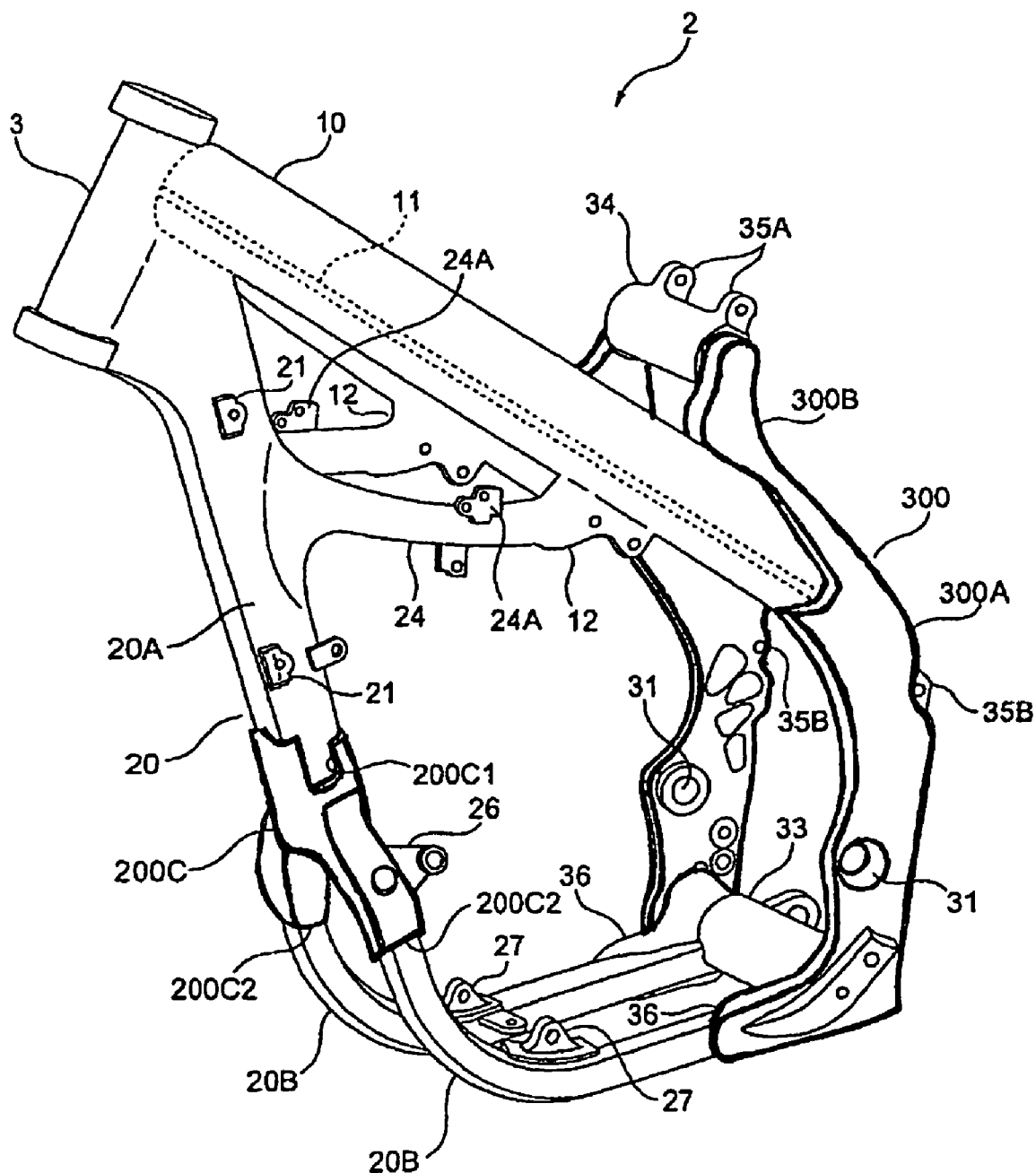
FIG. 17 is a perspective view of an isolated frame of an eighth embodiment of the inventive motorcycle frame showing an integrally cast body frame wherein a forged aluminum joint is welded between the down tube and the lower pipes of the cast body frame and forged aluminum pivot plates are welded to a rear end of the cast body frame.
Figure 18:
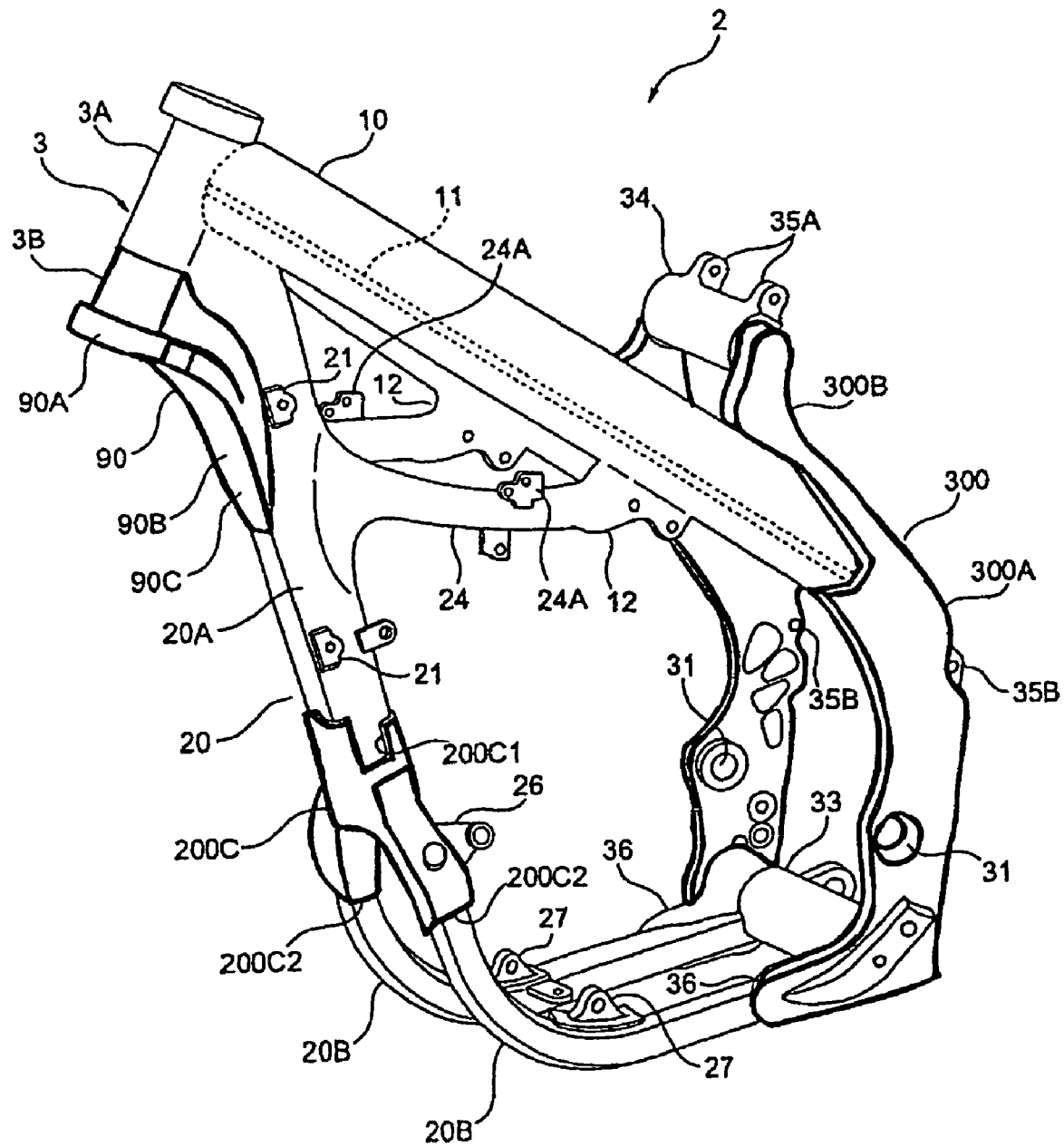
FIG. 18 is a perspective view of an isolated motorcycle frame according to a ninth embodiment of the present invention, showing an integrally cast body frame wherein a forged aluminum joint is welded between the down tube and the lower pipes of the cast body frame, forged aluminum pivot plates are welded to a rear end of the cast body frame, and a forged aluminum connector is welded to an under chin portion of the cast body frame.

In addition, a frame 2 may be constituted such that at least two components among the connection body 90, the connection joint 200C, and the pivot plates 300, which are described in the first to third embodiments, are the forgings, or, of course, all of them can be forgings, and other frame components are castings. In this regard, FIG. 15 shows an integrally cast body frame in which a forged aluminum connector is welded to an under chin portion of the cast body frame and forged aluminum pivot plates are welded to a rear end of the cast body frame. FIG. 16 shows an integrally cast body frame in which a forged aluminum connector is welded to an under chin portion of the cast body frame and a forged aluminum joint is welded between the down tube and the lower pipes of the cast body frame, and FIG. 17 shows an integrally cast body frame wherein a forged aluminum joint is welded between the down tube and the lower pipes of the cast body frame and forged aluminum pivot plates are welded to a rear end of the cast body frame.

In the above respective embodiments, descriptions are given for the cases where the one portion 3A of the head pipe 3 or the entire head pipe 3, the main frames 10, the down tube 20A, and the reinforcing frame 24 are integrally molded by a large scale aluminum casting. However, aluminum castings for the frame components can be integrally molded by a large scale aluminum casting in arbitrary combinations thereof. For example, the head pipe 3, the main frames 10, and the down tube 20A can be integrally molded by a large scale aluminum casting, and the reinforcing frame 24 may be formed as a separate component.

Moreover, in each of the above embodiments, although each of the description is given for the case where the body frame 2 is constituted with aluminum forgings and castings, for those forgings and castings, a material other than aluminum, such as magnesium, can be adopted.

Furthermore, in each of the above embodiments, each of the description is given for the case where the present invention is applied to a semi-double cradle type body frame in which the down tube 20A is extended from the head pipe 3 as a single tube without division, and, then, is divided into two tubes in a position anterior to the engine 4. However, the present invention can also be applied to a double cradle type body frame or the like in which down tubes constituted by two tubes extend separately from the head pipe 3 in a lower direction of the body, and then, extend in a rearward direction. In addition, the present invention can be widely applied to a body frame of an on-road motorcycle other than that of an off-road motorcycle such as a moto-cross motorcycle or a trial motorcycle.

While a working example of the present invention has been described above, the present invention is not limited to the working example described above, but various design alterations may be carried out without departing from the present invention as set forth in the claims.

What is claimed is:

1. A motorcycle frame, comprising:
   a head pipe;
   a pair of main frames integrally attached to the head pipe and extending rearwardly therefrom;
   a down tube attached to, and extending downwardly from the head pipe under the main frames;
   a pair of lower pipes which extend rearwardly from the down tube;
   a pair of forged pivot plates; and
   a reinforcing body disposed at a connection portion of the head pipe and the down tube,
   wherein:
   a part of said reinforcing body forms a lower portion of said head pipe, and is configured to receive an upper part of a motorcycle steering shaft therethrough;
   the reinforcing body is formed by forging, and the head pipe, the main frames, and the down tube and the lower pipes are all formed integrally by a large scale casting;
   the main frames and the lower pipes are connected to each other by the pivot plates; and
   the pivot plates are disposed at, and join, rear ends of the main frames and rear ends of the lower pipes.

2. The motorcycle frame of claim 1, wherein the reinforcing body is welded to the connection portion.

3. The motorcycle frame of claim 1, wherein the reinforcing body is fixed to both a lower portion of the head pipe and a front portion of the down tube covering a lower front surface of the down tube.

4. The motorcycle frame according to claim 3, wherein the reinforcing body comprises a pipe portion and an extended portion extending from the pipe portion along the down tube, the pipe portion and the extended portion respectively joined at their upper surfaces to the head pipe and the down tube.

5. The motorcycle frame according to claim 1, wherein the reinforcing body is formed of forged aluminum, and the head pipe, the main frames, and the down tube are each formed of cast metal comprising aluminum.

6. The motorcycle frame of claim 1, wherein each of the pivot plates comprises a curved portion curved in a forward direction at a lower end thereof, and an extended portion which extends upwardly from the curved portion, and wherein the extended portions of the pivot plates are welded to respective rear ends of the main frames.

7. The motorcycle frame according to claim 1, wherein the pivot plates are formed of forged aluminum, and wherein the head pipe, the main frames, the down tube, and the lower pipes are each formed of cast metal comprising aluminum.

8. The motorcycle frame according to claim 1, further comprising:
   a connection joint connecting the down tube and the lower pipes;
   wherein the head pipe, the down tube, and the connection joint are integrally cast, and the reinforcing body is welded to the connection portion of the head pipe and the down tube.

9. The motorcycle frame according to claim 8, wherein the reinforcing body is formed of forged aluminum, and the head pipe, the main frames, the down tube, the lower pipes, and the connection joint are formed of cast metal comprising aluminum.

10. A motorcycle frame, comprising:
    a head pipe;
    a pair of main frames integrally attached to the head pipe and extending rearwardly therefrom;
    a down tube attached to, and extending downwardly from the head pipe under the main frames;
    a reinforcing body disposed at a connection portion of the head pipe and the down tube, wherein a part of said reinforcing body forms a lower portion of said head pipe, and is configured to receive an upper part of a motorcycle steering shaft therethrough;
    a pair of lower pipes which extend rearwardly from the down tube; and
    a forged connection joint interconnecting the down tube and the lower pipes;
    wherein the reinforcing body is formed by forging, and the head pipe, the main frames, the down tube, and the lower pipes are all formed integrally by a large scale casting.

11. The motorcycle frame of claim 10, wherein the connection joint is a hollow structure and comprises:
    a tube insertion socket which receives a lower end of the down tube therein; and
    two pipe insertion sockets disposed in parallel with each other on an opposite side of the connection joint relative to the tube insertion socket, each of the pipe insertion sockets adapted to receive a front end portion of a lower pipe therein.

12. The motorcycle frame of claim 11, wherein the tube insertion socket is welded to the down tube, and wherein each pipe insertion socket is welded to a front end portion of a respective lower pipe.

13. The motorcycle frame of claim 10, wherein the connection joint comprises an engine hanger formed integrally thereon.

14. The motorcycle frame according to claim 10, wherein the connection joint is formed of forged aluminum, and the head pipe, the main frames, the down tube, and the lower pipes are formed of cast metal comprising aluminum.

15. A motorcycle frame comprising a semi-double cradle body frame comprising a down tube extending from a head pipe as a single tube, and a lower end of said down tube being operatively attached to two lower tubes, and wherein said body frame further comprises a pair of main frames integrally attached to said head pipe and extending rearwardly therefrom, the motorcycle frame further comprising:
    a reinforcing body disposed on a connection portion of the head pipe and the down tube, wherein a part of said reinforcing body forms a lower portion of said head pipe, and is configured to receive an upper part of a motorcycle steering shaft therethrough; and
    wherein the reinforcing body is formed by forging, and the head pipe, main frames and down tube are all integrally formed from a single casting.

* * * * *